United States Patent [19]

Meyers et al.

[11] Patent Number: 5,589,983
[45] Date of Patent: Dec. 31, 1996

[54] METHOD OF MANUFACTURING A DIFFRACTIVE SURFACE PROFILE

[75] Inventors: Mark M. Meyers, Hamlin; Mark E. Schickler, Webster, both of N.Y.

[73] Assignee: Eastman Kodak Company, Rochester, N.Y.

[21] Appl. No.: 174,737

[22] Filed: Dec. 29, 1993

[51] Int. Cl.$^6$ ............................................. G02B 26/08
[52] U.S. Cl. ............................... 359/566; 359/565
[58] Field of Search ................................. 359/565, 566, 359/569; 33/19.2, 19.3; 76/DIG. 12; 82/123; 83/879

[56] References Cited

U.S. PATENT DOCUMENTS

| | | | |
|---|---|---|---|
| 1,343,319 | 6/1920 | Herzog | 82/123 |
| 2,745,445 | 5/1956 | Klawitter | 82/123 |
| 3,639,991 | 2/1972 | Douglas | 33/19.2 |
| 4,012,843 | 3/1977 | Harada et al. | 33/19.2 |
| 4,219,933 | 9/1980 | Kita et al. | 33/19.2 |
| 4,690,506 | 9/1987 | Kita et al. | 33/19.2 |
| 4,768,183 | 8/1988 | Ohnishi et al. | 369/112 |
| 5,044,245 | 9/1991 | Molleker et al. | 82/123 |
| 5,044,706 | 9/1991 | Chen | 359/357 |
| 5,058,281 | 10/1991 | Leviton | 33/19.2 |
| 5,078,513 | 1/1992 | Spaulding et al. | 385/14 |
| 5,078,551 | 1/1992 | Oomen | 76/DIG. 12 |
| 5,108,187 | 4/1992 | Hirst | 359/566 |
| 5,117,306 | 5/1992 | Cohen | 359/565 |
| 5,117,433 | 5/1992 | Tatsuno et al. | 372/22 |
| 5,161,057 | 11/1992 | Johnson | 359/566 |
| 5,188,013 | 2/1993 | Cardinale | 83/879 |
| 5,208,701 | 5/1993 | Maeda | 359/574 |
| 5,229,880 | 7/1993 | Spencer et al. | 359/353 |
| 5,268,790 | 12/1993 | Chen | 359/558 |

FOREIGN PATENT DOCUMENTS 0557057  8/1993  European Pat. Off. ........ B23B 27/20

OTHER PUBLICATIONS

"Aspherical Molded Glass Lens of Super–Low Chromatic Aberration", Y. Tanaka et al., National Technical Report, vol. 35, No. 2, Apr. 1989, pp. 138–143.
"Spherical Grating Objective Lenses for Optical Disk Pick–ups", K. Goto et al., Proc. Int. Symp. on Optical Memory, 1987, Japanese Journal of Applied Physics, vol. 26 (1987), Supplement 26–4, pp. 135–140.
"An Objective with a Phase Plate", A. I. Tudorovskii, Optics and Spectroscopy, Feb., 1959, vol. VI, No. 2, pp. 126–133.
Third International Conference On Holographic Systems, Components and Applications (IEE), 16 Sep. 1991, Edinburgh, UK–pp. 190–194–Antier 'Diffractive Optical Elements in Flir'.
Optics News, vol. 12, No. 12, Dec. 1989, pp. 39–40–Clark et al., 'Production of Kinoforms by Single Point Diamond Machining'.
Applied Optics, vol. 32, No. 13, 1 May 1993, New York US, pp. 2295–2302–Londono et al., 'Athermalization Of A Single–Component Lens with Diffractive Optics'.

Primary Examiner—Martin Lerner
Attorney, Agent, or Firm—Svetlana Z. Short

[57] ABSTRACT

A method of manufacturing a diffractive surface comprising: rotating a surface to be cut at a rate W>1,500 RPM; translating a cutting tip at low speed V where V<1.2 mm/minute; and cutting the surface with the cutting tip.

20 Claims, 14 Drawing Sheets

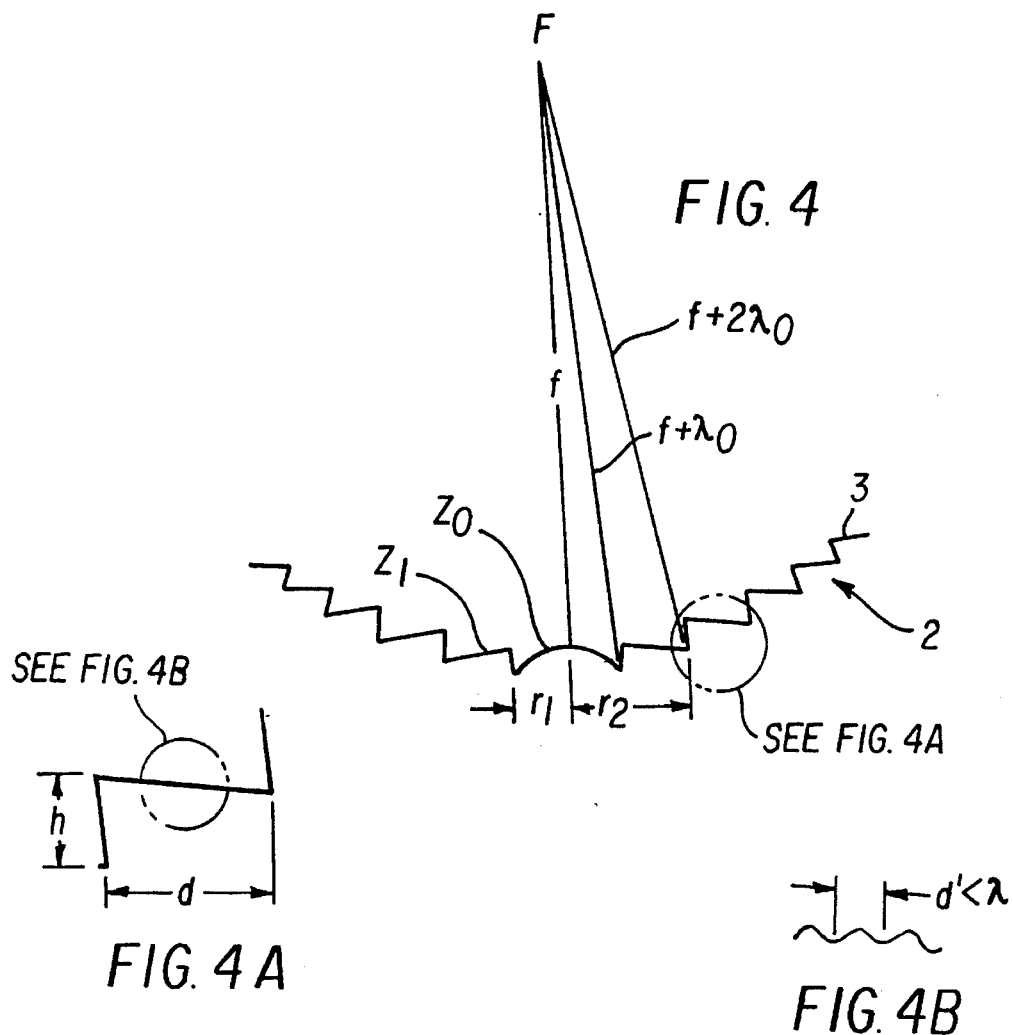
FIG. 4
FIG. 4A
FIG. 4B
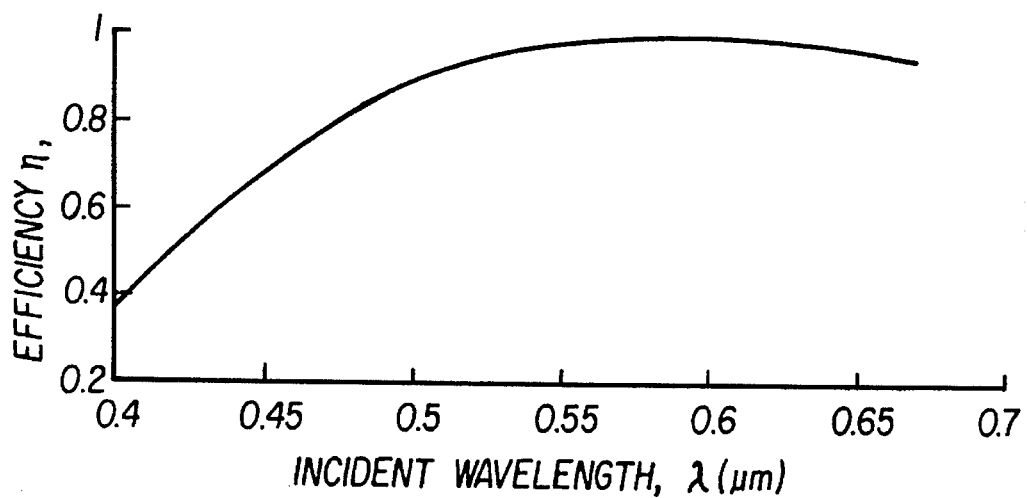
FIG. 5

MAX. OPD = -0.004   MIN. OPD = -0.261

METHOD OF MANUFACTURING A DIFFRACTIVE SURFACE PROFILE

CROSS-REFERENCE TO RELATED APPLICATIONS

This application is related to U.S. Ser. No. 08/175,708, filed Dec. 29, 1993, entitled HYBRID REFRACTIVE/DIFFRACTIVE ACHROMATIC CAMERA LENS, in the name of Mark M. Meyers.

BACKGROUND OF THE INVENTION

1. Field of the Invention

The present invention relates to hybrid refractive/diffractive lens systems and particularly to a refractive/diffractive achromat which is especially suitable for use as a taking (or an objective) lens in inexpensive cameras such as single-use cameras and a method of producing diffractive surfaces for such lens systems.

2. Description Relative to Prior Art

In order to obtain photographs with good quality images, the lens that focuses the light must be well corrected for aberrations. It is not enough for the objective lens to be corrected for monochromatic aberrations. The lens must also be corrected for chromatic aberrations for a relatively broad range of wavelengths. For each color or wavelength of light incident on a refractive lens, the lens will have a different focal length. It is this property of the lens that give rise to (longitudinal and lateral) chromatic aberrations. Currently, the objective lenses for cameras correct chromatic aberrations by using additional lens elements. However, this creates additional bulk and makes the lens system heavier and more expensive. These considerations are especially important for single use cameras which need to be light weight, compact and inexpensive.

Single-use cameras typically include a one or two element lens utilized at a large F/# so they can be used In a fixed focus mode where everything from two meters to infinity is nearly in focus. Single-use cameras of a single lens element type typically are not corrected for chromatic aberrations, which all singlets tend to suffer from. Lenses used for single-use cameras generally have relatively high levels of monochromatic and chromatic aberrations. Some of the monochromatic aberrations can be corrected in a plastic molded singlet element through the use of aspheric surfaces. However, at some point, the chromatic aberrations will be significantly worse than the monochromatic aberrations therefore limiting the minimum spot size. The resulting unachromatized images can also exhibit color fringing.

Current single-component objective lenses used in single-use cameras are made of low dispersion, low index of refraction materials (usually plastic) to minimize longitudinal chromatic aberration. Thus, in order to reduce the difficulty of correcting for chromatic aberration in a single-element lens system, lens designs have been driven in the direction of reducing dispersion (using low index, high Abbe number glass) in order to obtain the necessary power and reduce the numerical aperture (NA) of the lens. Higher curvature, thicker lenses have therefore been required. Such thicker lenses give rise to manufacturing errors since they are more sensitive to variations in lens thickness, wedge, tilt, and decentering.

Additional lens elements are used to provide chromatic aberration correction in multi-element, more costly, lens systems. When a cemented doublet (comprised of a positive and a negative power lens element) is used to correct for chromatic aberrations, a negative power lens element made of flint glass (i.e. glass having a low Abbe number) is cemented to the positive lens element which is typically made from a crown glass. However, because the negative lens element increases the focal length, the positive lens element is made stronger to compensate for that change in order to keep the original focal length. In order to obtain the necessary power, the positive lens element will thus need to have stronger radii of curvature and to be thicker. Such lenses also sacrifice weight and size in order to accommodate surfaces and elements which compensate for chromatic aberration. Alternatively, two air spaced, roughly symmetrical, lens elements separated by an aperture stop can also be used to get a better system performance. However, an additional element again increases weight and size of the system. Finally, when designing a single element optical system, a designer may use low dispersion glasses that still have a high index of refraction. However, such glasses are expensive.

Although various patents and publications have discussed the use of diffractive elements to compensate for chromatic aberration (see U.S. Pat. No. 4,768,183, U.S. Pat. No. 5,117,433, U.S. Pat. No. 5,044,706, U.S. Pat. No. 5,078,513, U.S. Pat. No. 5,117,306, U.S. Pat. No. 5,161,057, U.S. Pat. No. 5,208,701, and U.S. Pat. No. 5,229,880), designs for objective or taking lenses in single element cameras have not had any chromatic correction and typically have relatively steep surface curvatures. As previously mentioned, in order to avoid these and other problems, some single-use camera lens systems include two lens elements separated by an aperture stop. Similarly, consumer camera lenses in visible light applications, such as for taking photographs of friends, relatives or nature, use multiple lens elements to correct for chromatic aberrations.

Finally, several methods for manufacturing diffractive surfaces are known. A diffraction profile may be manufactured by a binary method, i.e. a "step function" method by etching the surface while applying consecutively two to four masks.

A "step function" method also results in alignment errors which result in inaccurracies introduced in a diffractive surface profile. The errors are introduced because the manufacturing process requires that each mask level be aligned with respect to the other. For example, a single zone comprised of 16 steps is made with four masks. Each of the four masks has to be aligned with respect to the others. Although such masks are aligned to each other to within a fraction of micron, the alignment errors nevertheless cause decreased diffraction and introduce wavefront errors. At the present time, there is no known method resulting in a perfect alignment of the masks.

Alternatively, a diffractive surface or a mold for manufacture of such surface may be cut using a diamond turning method.

Typically, diamonds used in diamond turning of Fresnel-like surfaces are fabricated with radii of 150 to 100 um or with a diamond having a flat of 3 μm or more. This radius helps to reduce surface roughness and increase lifetime. However, the radius on the tool limits the sharpness of the corners. The decreased sharpness in the corners leads to more scattering and more undiffracted light. Also, in many instances the zone spacings one is required to fabricate are smaller than the radius of the diamond tips. Therefore, it would be impossible to fabricate them with this type of a rounded diamond tip. A diamond tip with a flat of 3 μm or more also reduces the efficiency of the optical system and increases scattering.

SUMMARY OF THE INVENTION

The present invention deviates from the conventional wisdom in the field of optical design and manufacturing of camera lenses (such as optical objectives) operating in visible spectrum by achromatizing the lens system in the visible spectrum with a diffractive surface. A method of manufacturing, in accordance with the invention, comprises: a) mounting a surface to be cut on a spindle; b) rotating said spindle at a high speed W thereby rotating the surface to be cut at speed W, where W>1,500 RPM; c) translating a cutting tip at the low speed v, where V<1 mm per minute; and d) cutting said surface with the cutting tip.

According to one aspect of the invention, a diamond tip for manufacturing diffractive surfaces, said diamond tip having a small flat surface on its tip, said small flat surface having the width l, where l<2 μm.

BRIEF DESCRIPTION OF THE DRAWINGS

The foregoing and other objects, features and advantages of the invention will become more apparent from a reading of the following description in connection with the accompanying drawings in which:

FIG. 4 is a greatly enlarged side view of the diffractive surface of the lens shown in FIGS. 1 and 2 showing the surface blaze profile of a few zones, the actual thickness or height h of each zone being of the order of 0.8–1.4 μm and the spacing between the zones actually being of the order tens of microns (40 μm–600 μm);

FIG. 4A is a greatly enlarged side view of a groove of the diffractive surface shown in FIG. 4;

FIG. 4B is a greatly enlarged side view of the diamond turning marks on the diffractive surface shown in FIG. 4;

FIG. 5 is a plot of the efficiency of the lens for design wavelength $\lambda_0$ of 587.6 nm;

FIG. 6A shows the ray aberration corresponding to the vertical axis of 0.40 mm (±0.20 mm) while FIG. 6B shows similar curves where the vertical axis is one wavelength (±½λ);

DETAILED DESCRIPTION OF PREFERRED EMBODIMENT

Figure 1:
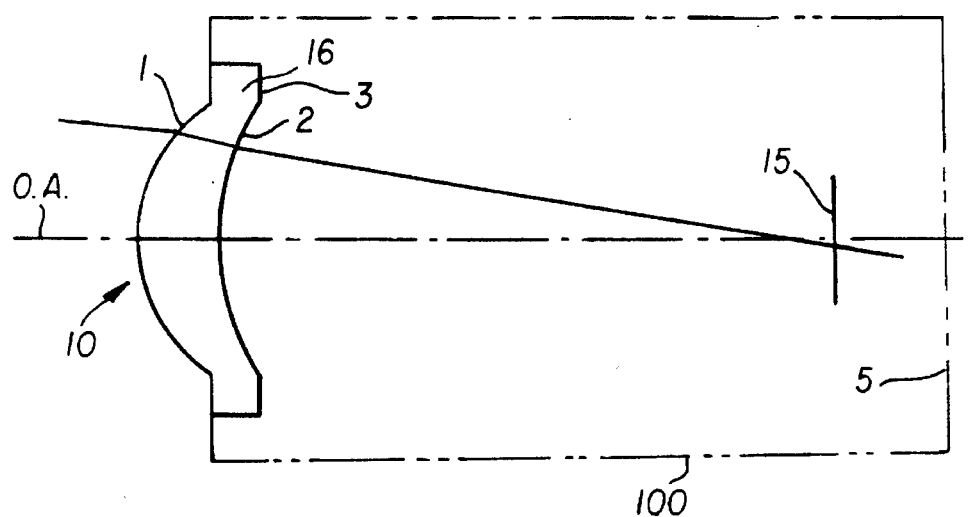
FIG. 1 is a schematic diagram of a refractive/diffractive hybrid lens 10 in accordance with the invention shown spaced from photographic film upon which an image is formed, the lens having a curved surface 1 and a diffractive grating surface 3 formed on curved surface 2, the features on the diffractive surface being too small to be seen on the scale of the Figure.
Figure 2:
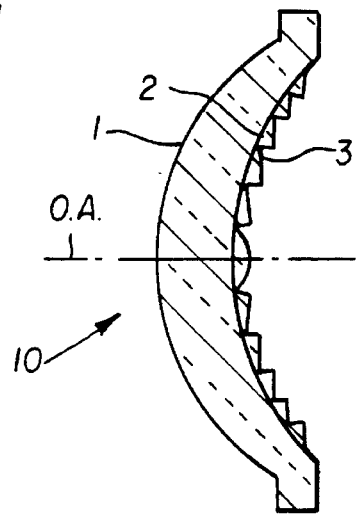
FIG. 2 is a sectional view of the lens shown in FIG. 1 but the diffractive surface features are greatly magnified.

Referring to FIG. 1, there is shown a diffractive/refractive hybrid lens 10 for use in visible light camera applications and more specifically for use in a single-use camera having a photographic film 15 supported at a suitable location so that an image is produced by the lens on the film. The lens 10 is a convex-concave single element or singlet having from an object side a convex-curved surface 1 and a Fresnel zone pattern 3 on the concave-curved surface 2 of the lens body which is the surface opposite to the first curved surface 1. Both surfaces 1 and 2 are perpendicular to the optical axis of the lens. The refractive lens is made from optically transmissive material having an index of refraction of at least 1.49. Suitable and preferable material is any moldable material such as optical plastic or glass. If the lens element will be molded, a plastic material is more preferable because it is cheaper and easier to mold. Alternatively, if the lens is not to be molded, a diffractive zone pattern may be diamond turned or cut on the lens surface. If the lens is not to be molded, the lens material does not need to be suitable for molding purposes. FIG. 2 shows the lens 10 and emphasizes its curved surface 2 which defines the refractive portion of the element as well as the Fresnel zone pattern 3 which defines the diffractive portion of the element. An annular ring 16 is part of the lens body and is merely for attachment and location in a camera barrel. The lens F-number is f/11 and the lens accommodates a field angle of ±32 degrees. The overall thickness of the lens may be less than 4 mm and it is preferred that it be about 1.0–3.0 mm (millimeters). It is 1.4 mm in this embodiment. The focal length of lens 10 is 35 mm and it accommodates the field angle of ±32°. The base radius of the curved surface (or substrate) 2 on which the diffractive surface 3 of the lens 10 is formed (shown in FIG. 3), is located is 11.43 mm to a point along the optical axis on the right of that surface. The diffractive surface 3 of the diffractive portion of the lens element 10 has a radius of curvature that corresponds to an effective focal length f of 364.2 mm. Exemplary dimensions and spacings are set forth in Table 1, the index $n_{\lambda n}$ is at the center of range being measured at the nominal wavelength $\lambda_n$=587 nm (or 0.587 μm) and $n_{\lambda n}$ is 1.496.

TABLE 1

| Surface | Radius | Thickness | Material | Index | V Number |
| --- | --- | --- | --- | --- | --- |
| 1 | 7.42 | 1.4 | Plexiglass | 1.492 | 57.3 |
| 2 | 11.4343[1] | 0 | Plexiglass | | |
| 3 | NA[2] | 0 | | 10,000 | −3.5 |
| Air | | 4.309 | Air | 1. | 1. |
| Stop | | 28.3096 | | | |
| Image plane | −120.000[3] | | | | |

[1]Base radius is 11.4343. This surface is an "internal" surface used for design purposes, i.e. there is no index brake between surfaces 2 and 3 in this embodiment.
[2]This surface profile is an asphere; radius of curvature corresponds to focal length of = 364.2. The aspheric profile of the surface as described by equation 12; and where AD = 0.8265207E-8; AE = −0.1041272E-8; AF = 0.612808E-10; and AG = −.1356105E-11.
[3]Cylindrical shape.

The lens of the first embodiment has a nominal or center wavelength of $\lambda_n \lambda_d$=587 nm. The lens is achromatized for 480 to 680 nm bandwidth around this center wavelength. Specifically, the design wavelengths are: $\lambda_f$=486 nm, $\lambda_d$=587 nm, and $\lambda_c$=656 nm.

The depth h of echelons in the zones is shown exaggerated in FIGS. 2 and 4 and may be of the order of a 0.8 to 1.4 micron and it is preferable that they be 0.9 to 1.2 microns. The spacing d between the zones in this embodiment is between 40 and 600 microns (μm). It is preferable that the spacing d be on the order of tens of microns, but it can be 1 to 1000 μm.

It is preferable that the diffractive surface 3 be formed on the curved (base) surface such as surface 2 which acts as a substrate. In this embodiment, the diffractive surface is formed on a concave surface with radius of curvature of 11.43 mm. However, the concave surface 2 in this embodiment is an internal surface of the lens and is not a real, separate surface because the same index material is used to mold the entire lens.

The achieved achromat is a single element or singlet, but in effect works as a cemented doublet because the refractive and diffractive portions of the lens element work together to add to the final total power. It is preferred that the refractive portion of the lens component has 85–97% of total power of the lens component. Table 1, which will be discussed in greater detail below, shows that about 90% of the total power of the achromat is in the refractive portion of the lens element and about 10% is in the diffractive portion of the lens element. Therefore, the achromat behaves much like a regular singlet. Since both surfaces of the refractive portion of the lens element are curved (i.e. the front surface 1 and the internal or substrate surface 2), there are at least two degrees of freedom to modify the lens in order to control aberrations. In addition, one or both of the real or actual surfaces (surfaces 1 and/or 3—i.e. external surfaces) may be aspheric. In this embodiment, aspheric terms on the diffractive surface allow for better aberration correction. The diffractive surface compensates for longitudinal chromatic aberration, but also because of introduction of higher order terms (4th order, 6th order, 8th order and 10th order corresponding to AD, AE, AF and AG coefficients), in the phase function [equation (4)] of the diffractive surface 3, monochromatic aberrations, such as spherical aberration and coma are also substantially corrected.

Consider the design of the diffractive surface 3. The design takes advantages of the wave nature of light. Light travels in waves, which can interfere. If the waves interfere such that the peaks and valleys coincide, the energy in the two waves adds to each other; this is referred to as constructive interference. Note that if one of the waves is delayed exactly one or more wavelengths behind the other, then it is once again in phase, and they will interfere constructively. If the waves line up out of phase, the energy in one wave will cancel the energy in the other; this is referred to as destructive interference.

Figure 3:
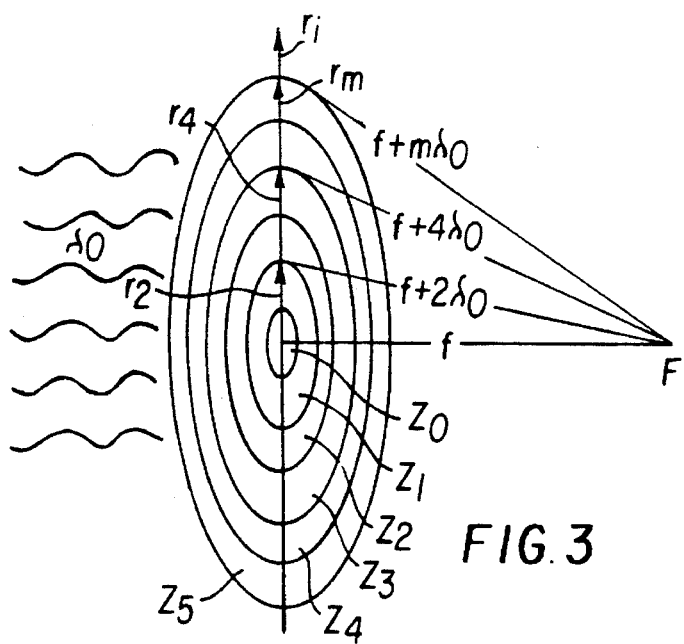
FIG. 3 is a diagrammatic, perspective view of a Fresnel zone pattern which may be formed as by blazing on the diffractive surface of the lens shown in FIGS. 1 and 2, where $\lambda_0$ is the design wavelength, m is an integer greater than 0, f is the focal length and F designates the focal point.

To design the diffractive surface, a diffractive zone pattern is used, as shown in FIGS. 3 and 4. Such a zone pattern consists of multiple o zones $Z_i$. A focal point, F, is designated at a distance, f, from the center of the pattern. This distance is equal to the focal length. The rings, or zones, are spaced such that the edge of each zone is exactly one wavelength further away from the point F. This way light passing through the pattern at the edges of the zones will be in phase and constructively interfere at the point F.

Using right triangles, an equation can be derived that gives the zone radius or zone spacing $r_m$ as a function of the focal length f (distance from the pattern to F) and the wavelength of light $\lambda_0$ used to design the zone pattern (i.e. blaze wavelength) and m is a zone number:

$$r^2 + f^2 = (f + m\lambda_o)^2. \qquad (1)$$

Assuming the wavelength of light is much smaller than the focal length, Equation (1) can be reduced to:

$$r_m^2 = 2m\lambda_0 f, \qquad (2)$$

or $$r_m = \sqrt{2m\lambda_0 f}. \qquad (3)$$

From Equation (3), it can be seen that the diffractive surface has a strong dependence on the wavelength of light used to construct the zones. If the wavelength of light incident on the diffractive surface deviates from the design wavelength, the focal length also changes. This is an important property when the diffractive surface is used to achromatize the refractive element.

Although the light propagating from the edge of zone is in phase when it gets to the focal point F (FIG. 3), light coming through the middle of each of the zones is not yet in phase, and therefore will not interfere constructively. To correct this problem, material is taken off (i.e. it is machined off if the diffractive surface is diamond turned) in a programmed manner in accordance with a profile desired so that the phase is delayed just enough so that at the point F, all the light coming through the surface constructively interferes. This blaze is shown in FIG. 4. Wherein, it can be seen that a step or zone is tapered towards the substrate. The tool is brought in to remove the programmed amount of material and then is brought out as the surface makes a spiral-like cut in the surface.

In the center of the first zone $Z_0$, where the material is the thickest, the light is delayed exactly one wavelength. Moving away from the center of the pattern, the distance from the focal point increases so that less material is needed at the periphery of zone $Z_0$. The material is gradually thinned to a minimum at the edge of the first zone, where no additional delay is needed, because the distance at the edge of the first zone is one wavelength further from the focal point than the center of the ring pattern. Again material is added at the next zone $Z_1$ to delay the light exactly one wavelength, but the light is still in phase. Since the material is once again thick, the process starts over. This way all the light passing through the diffractive surface will be in phase and constructively interfere at the focal point. In general, the phase delay introduced by such a surface can be described with Equation (4):

$$\phi = \frac{2\pi}{\lambda_0} (A_2 r^2 + A_4 r^4 + A_6 r^6 + A_8 r^8 + A_{10} r^{10}), \quad (4)$$

or $$\phi = \frac{2\pi}{\lambda} \left[ \left( \frac{Cr^2}{1 + \sqrt{1 - C^2 r^2}} \right) + AD^* r^4 + AE^* r^6 + AF^* r^8 + AG^* r^{10} \right].$$

Giving value to the higher order phase terms, $A_4$, $A_6$, etc., has the same advantage as introducing aspherical terms (AD, AE, AF and AG) for a glass (or plastic) surface, and is useful for minimizing monochromic aberrations. Whenever $\phi$ is equal to an integer multiple of $2\pi$, r is the radius of a new zone.

Using Equation (4), it is possible to design a diffractive surface that is nearly 100% efficient at the desired focal point. The efficiency $\eta$ changes, however, with change in the wavelength of incident light, in a manner described by:

$$\eta(\lambda) = \left[ \frac{\text{SIN}\left[ \pi \left( \frac{\lambda_0}{\lambda} \left( \frac{n(\lambda) - 1}{n(\lambda_0) - 1} \right) - 1 \right) \right]}{\left[ \pi \left( \frac{\lambda_0}{\lambda} \left( \frac{n(\lambda) - 1}{n(\lambda_0) - 1} \right) - 1 \right) \right]} \right]^2 \quad (5)$$

where $\lambda_o$ is the design or blaze wavelength and $\lambda$ is the incident wavelength. For a design $\lambda_o$ or blaze wavelength $\lambda_o=\lambda_b=0.587$ μm (i.e., 587 nm) used in the first embodiment (which is the same as the nominal or center wavelength $\lambda_n=\lambda_d$), the efficiency as a function of wavelength is plotted in FIG. 5. However, an objective camera lens should work well for light at a wavelength range of at least 486 nm to 656 nm or about 490 nm to 650 nm. The undiffracted light, i.e. light not diffracted to the light focal point, becomes unwanted stray light at the focal plane. It creates a halo-like or a smear-like effect and decreases the lens efficiency.

Figure 5A:
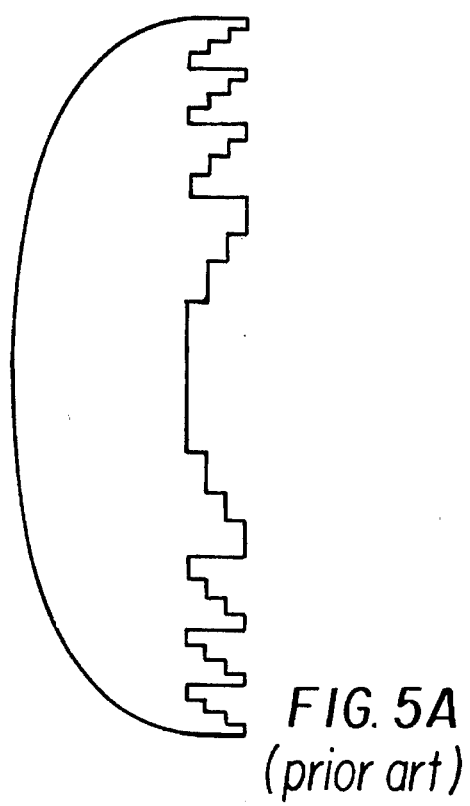
FIG. 5A is a schematic diagram of a prior art lens having a binary-type diffractive surface.

The lens shown in FIG. 1 is made utilizing a "linear blaze" method rather than a "step function" blaze method. A "step function" or "binary" kind of blazing typically results in 4 to 16 discrete steps comprising each zone (FIG. 5A). The examples of such surfaces are provided in U.S. Pat. No. 4,768,183 and U.S. Pat. No. 5,044,706. The diffractive surface of the lens system of this embodiment does not have zones made out of four to sixteen discrete steps and is found to have a much higher efficiency at the nominal or design wavelength ($\lambda_n=\lambda_d=\lambda_o$). While a lens with a "step" blaze would have an efficiency of about 95% (an eight step zone profile resulting from a three mask process) or less at the normal wavelength, this lens has an efficiency of about 100% at the nominal wavelength of 587 nm. The "Linear Blaze" method of manufacturing will be described later in the specification.

By equating Equations (6a) and (6b), for the powers of a thin glass lens $\phi_m$ and a diffractive lens $\phi_{diff}$, Equation (7) is obtained. Equation (7) is used to find the index of refraction with light at wavelengths other than the design wavelength $\lambda_o$.

$$\text{(a)} \quad \phi_{th} = [n(\lambda) - 1]c, \quad \text{(b)} \quad \phi_{diff} = \frac{\lambda}{f\lambda_0}, \quad (6)$$

$$n_{diff}(\lambda) = \frac{\lambda}{\lambda_0} [n(\lambda_0) + 1] - 1. \quad (7)$$

One measure of how dispersive glasses are, that is, how much their index changes with change in wavelength, is the Abbe v-number formula, Equation (8). Three wavelengths are picked, and their indices are substituted into Equation (7):

$$v = \frac{(n_d - 1)}{(n_f - n_c)}, \quad (8)$$

where $n_f$, $n_d$ and $n_c$ are the indices of refraction for the short, middle, and long wavelengths. When evaluating optical materials, the wavelengths chosen are usually $\lambda_f=0.48613$ μm, $\lambda_d=0.58756$ μm, and $\lambda_c=0.65627$ μm. For all glasses, the v number for these three wavelengths is between 20 and 90. Typically, the lower the v number, the further $n_f$ and $n_c$ are from each other, and the glass is more dispersive. However, somewhat different wavelengths range may be used for achromatizing the lens. In addition, the proper choice of a nominal wavelength may increase the overall diffraction efficiency of the lens. This is discussed in detail in conjunction with the second lens embodiment.

If Equation (7) is substituted into Equation (8), the Abbe v number for a diffractive lens is found to be $$v_{diff} = \frac{\lambda_{center}}{\lambda_{short\lambda} - \lambda_{long\lambda}}. \quad (9)$$

If $\lambda_f=0.480$ μm, $\lambda_d=0.5876$ μm, and $\lambda_c=0.656$ μm are chosen for short, long and center wavelengths respectively, as was done in the first embodiment, then using Equation (9), the v number for a diffractive lens in the visible range for 0.496 μm<λ<0.656 μm is found to be $$v_{diff} = -3.5. \quad (10)$$

This number has very important ramifications when achromatizing lenses. As was mentioned previously, one may want to achromatize the lens for the entire 0.4 μm to 0.68 μm or from 0.47 to 0.67 μm, or at least from about 0.49 μm to about 0.65 μm.

The power of the refractive element is balanced with the power of the diffractive surface. The power of each element adds to equal the desired power of the achromat $\phi_{tot}$, and the powers are also of the correct proportion so that the longitudinal chromatic aberration is zero. These powers are given by:

$$\text{(a)} \quad \phi_{ref} = \frac{v_{ref}\phi_{tot}}{v_{ref} - v_{diff}}, \quad \text{(b)} \quad \phi_{diff} = \frac{v_{diff}\phi_{tot}}{v_{diff} - v_{ref}}, \quad (11)$$

$$\text{(c)} \quad \phi_{tot} = \phi_{ref} + \phi_{diff},$$

where $v_{ref}$ and $v_{diff}$ are the v numbers for the refractive and diffracted elements, $\phi_{ref}$ and $\phi_{diff}$ are the powers of the two elements, and $\phi_{tot}$ is the total power of the lens. One may use either a low dispersion material (glass) or a high dispersion material for use in a refractive element. The trade-off is as follows: the focal length of the entire lens $\phi_{tot}$ is held constant. As the $v_{ref}$ becomes smaller (i.e., the material becomes more dispersive) the index or refraction $n_{ref}$ will typically raise. The higher is the index of refraction of the refractive system, the smaller (i.e. shallower) is the resulting Petzval curvature of the optical system. However, as $v_{ref}$ gets smaller, one will need more diffractive power.

Once the required focal length for the diffractive surface is found, zone spacings which results in this focal length are then determined as discussed in connection with FIGS. 3 and 4. Once the proper zone locations are determined, they are then fine-tuned to minimize field (monochromatic) aberrations, as discussed in connection with Table 1.

Equation (10) shows the v number for a diffractive lens is $v_d = -3.5$. Since the lowest v number for glasses is about 20, the diffractive lens is found to be much more dispersive than any refractive lens. It is also seen to be negative, where all glasses are positive. Equations (10a) and (10b) can thus be used to design a diffractive/refractive hybrid achromat with a focal length of 35 mm. Typical values for this lens are shown in Table 2 (typical values for a 35 mm focal length).

| Portion | $n_d$ | v number | power $\phi$ | % of total power f(=38.7 mm) |
|---|---|---|---|---|
| Moldable acrylic | 1.492 | 57.3 | $2.58 \times 10^{-2}$ | 90.3% |
| diffractive | 10,0001* | -3.5 | $2.75 \times 10^{-3}$ | 9.7% |

*This is a theoretical number used for design purposes.

Because of the unusually low, and negative, v number for the diffractive surface, Table 1 shows a weak positive diffractive portion of the lens element can be used to achromatize the lens. Since the powers of the two lens portions are no longer working against each other (i.e. they do not have opposite signs), the need for the power in the refractive portion of the lens is further reduced by using the diffractive portion of the lens. The advantage of having less power in the refractive portion of the lens element is a thinner lens with lower surface curvatures and reduced aberrations. Because the refractive portion of the lens element is thinner and because there is no bulky negative element, the diffractive/refractive hybrid achromat is much lighter than a solely refractive achromat made from glass or plastic. Additionally, because the surface curvatures (FIG. 1) are not steep, the refractive portion of the lens element in the hybrid introduces lower monochromatic aberrations than would be present in an all glass achromat.

The aspheric coefficients for the diffractive surface 3 are defined by Equation (12):

$$z(r) = \frac{Cr^2}{1 + \sqrt{1 - C^2 r^2}} + AD*r^4 + AE*r^6 + AF*r^8 + AG*r^{10}, \quad (12)$$

where z is the surface sag for the diffractive surface from a x—y plane tangent to the surface, C is the surface curvature, AD, AE, AF, AG, are the fourth, sixth, etc. aspheric coefficients, and r is a radial coordinate in the lens (shown in FIG. 3). An example of suitable coefficients is given in Table 1. The aspheric coefficients relate to the phase coefficients for the diffractive surface, defined in Equation (4). The wavefront coefficients are related to the surface sag coefficients by:

$$CVW = C*(n'_c - 1)$$

$$KW = K*(n'_c - 1)$$

$$D = AD*(n'_c - 1)$$

$$E = AE*(n'_c - 1)$$

$$F = AF*(n'_c - 1)$$

$$G = AG*(n'_c - 1) \quad (13)$$

where $CVW = C*10,000$ and $n'_c =$ "construction" refractive index of the diffractive element which is set to 10,000 for high accuracy modeling). This index of 10,000 is not an actual refractive index of the diffractive element. CV is the surface curvature.

Figure 6A:
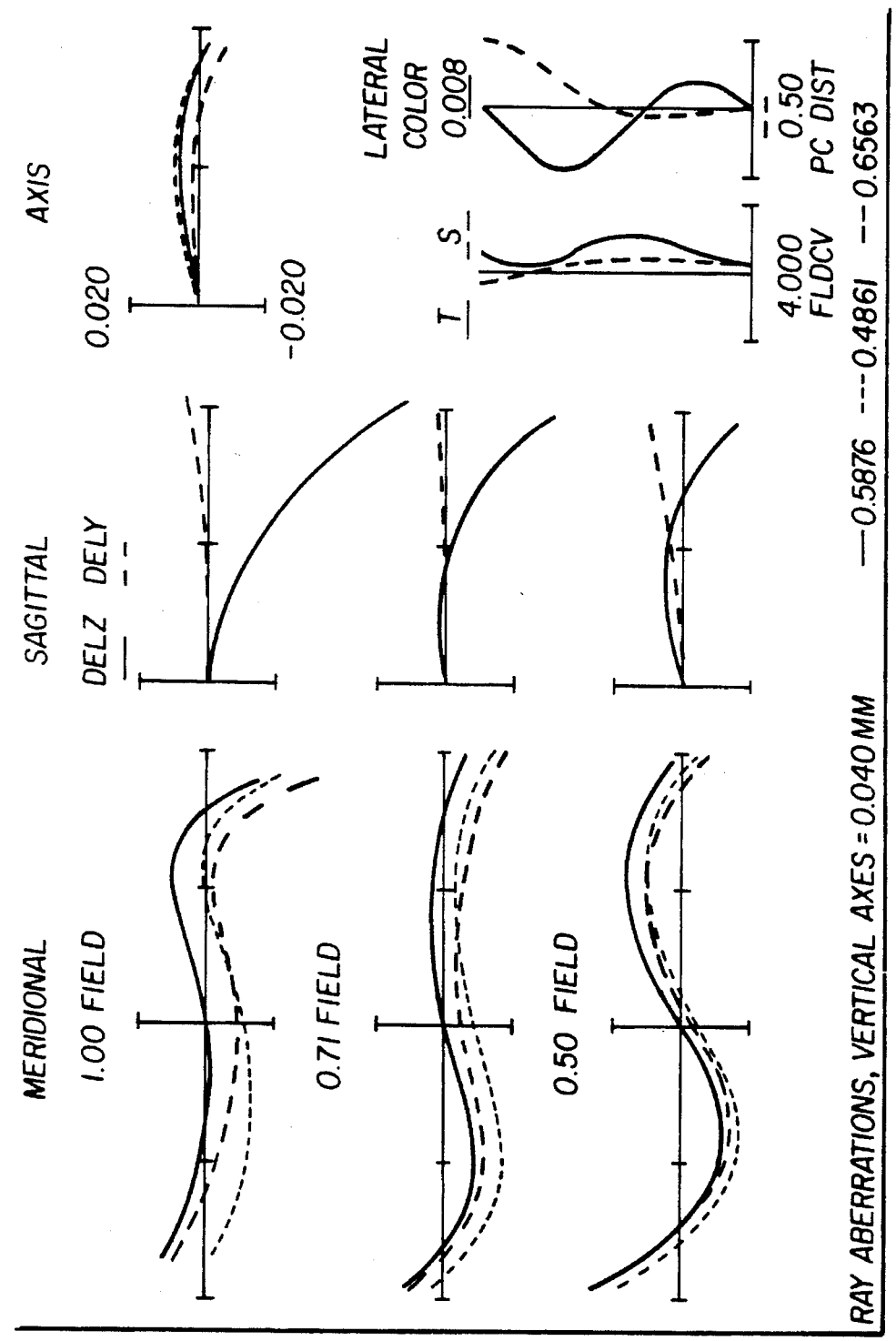
FIGS. 6A and 6B are plots of the ray aberration of the refractive diffractive lens of FIG. 1 for on axis, 0.7 field as well as full field. The full field is ±32°.
Figure 6B:
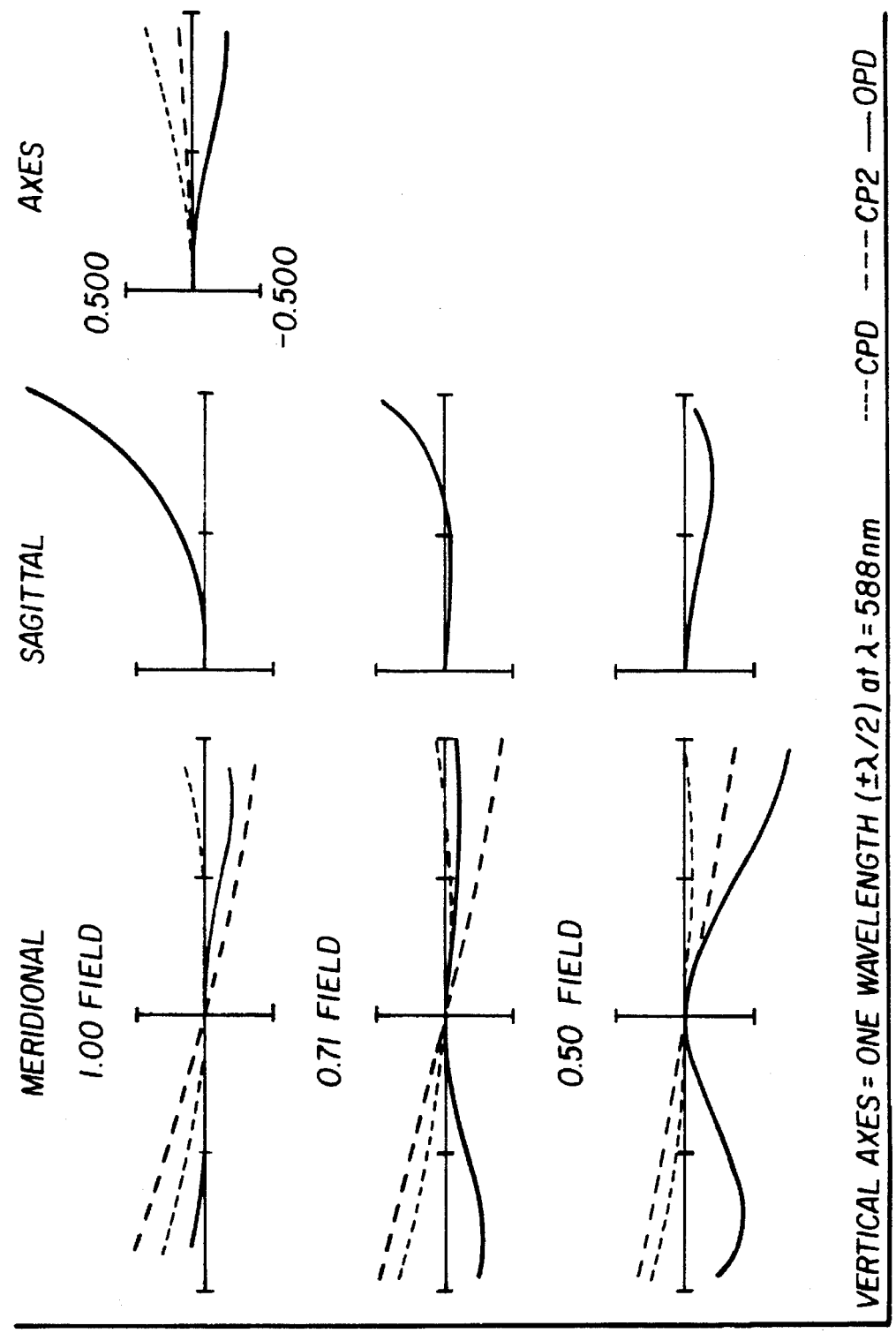

FIGS. 6A and 6B provide aberration curves for the refractive/diffractive lens. They show the performance of the lens for on axis, 0.7 field as well as to the 1.0 field. The full field is ±32°. These figures show that the refractive/diffractive lens, indeed, has a superior performance (a factor of 2 or better than a typical unachromatized lens element). For example, none of the aberration curves (in meridianal plane) exceed ±0.02 mm (i.e. $\Delta<0.04$ mm or a 40 $\mu_\lambda$, where $\Delta$ is a diameter of a blur circle).

FIG. 6B is a plot of the optical path difference (OPD) at 0.7 and 1.0 field. It can be seen that OPD is less than ±0.5 wavelength throughout the field and thus the lens is nearly diffraction limited. The OPD only slightly exceeds it at 0.5 field at the edge of the aperture.

FIGS. 6A–6B shows that the lens design has a good performance out to the full field, thus giving a wide margin of error for manufacturing tolerances.

Figure 7:
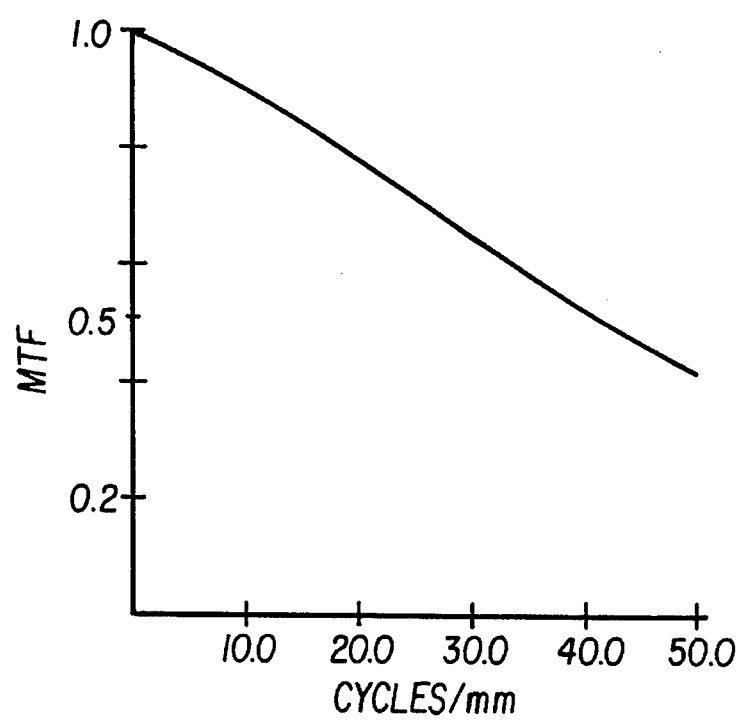
FIG. 7 is a plot of the on axis, polychromatic MTF of the refractive/diffractive lens of FIG. 1.
Figure 10:
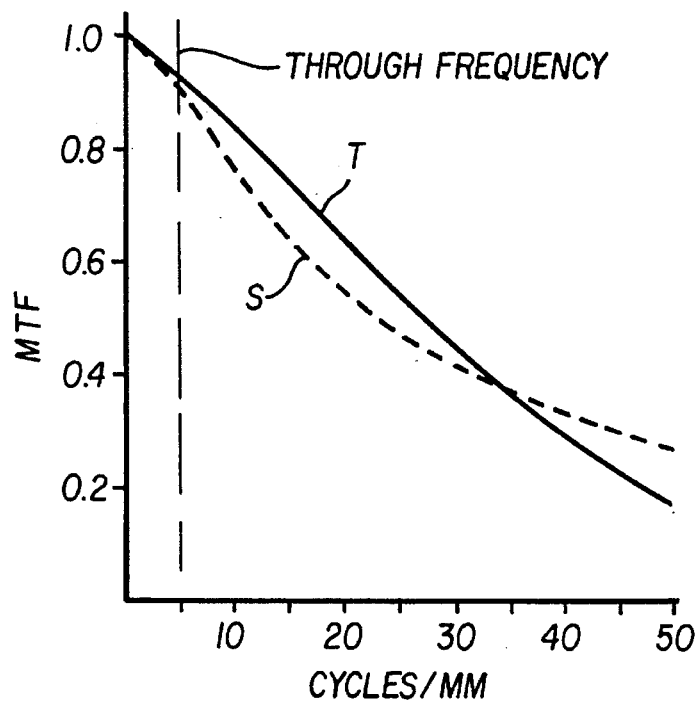
FIG. 10 is a plot of the polychromatic MTF corresponding to the 0.7 field, i.e., a half field angle of 22.4° of the refractive/diffractive hybrid lens of FIG. 1.
Figure 11:
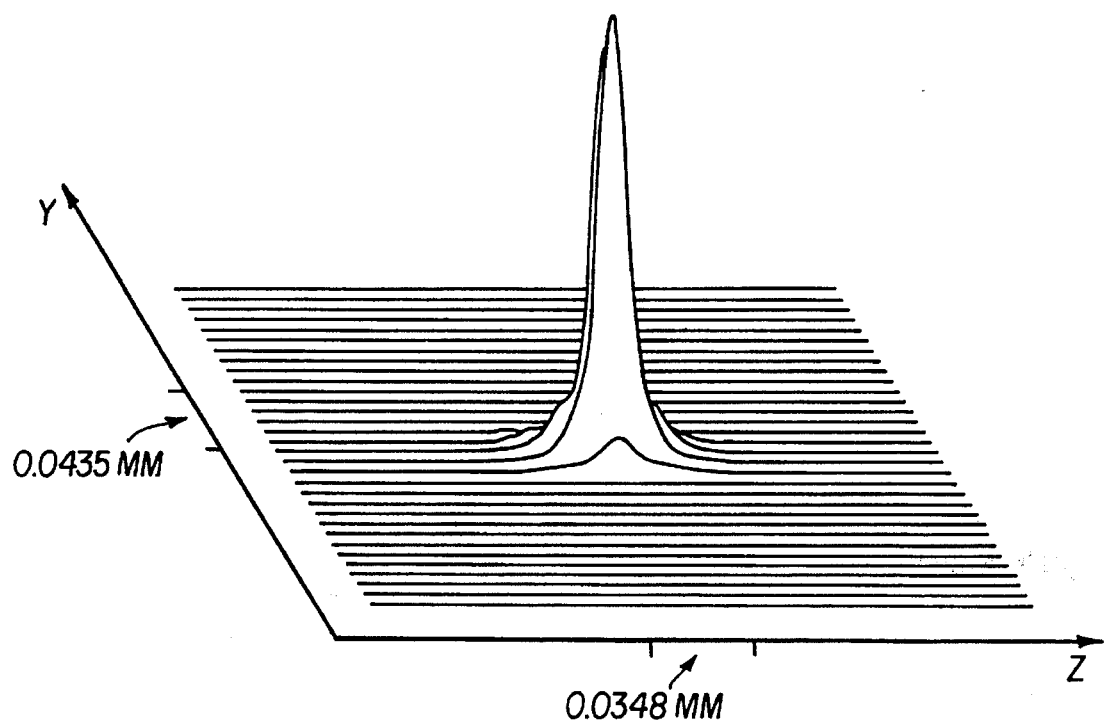
FIG. 11 is a plot of a polychromatic point spread function corresponding to the 0.7 field, i.e., a half field angle of 22.4° of the refractive/diffractive hybrid lens of FIG. 1.
Figure 12:
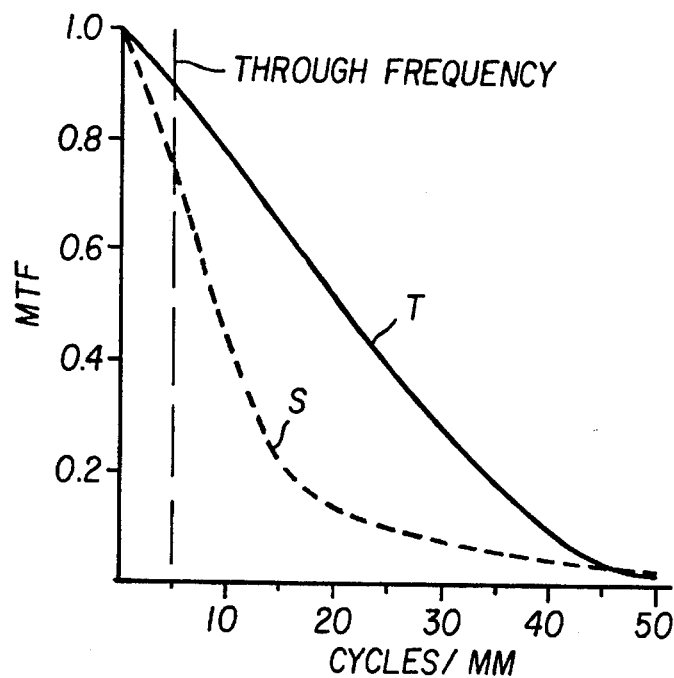
FIG. 12 is a plot of the polychromatic MTF corresponding to the full field, i.e., a half angle of 32° of the hybrid lens of FIG. 1.
Figure 13:
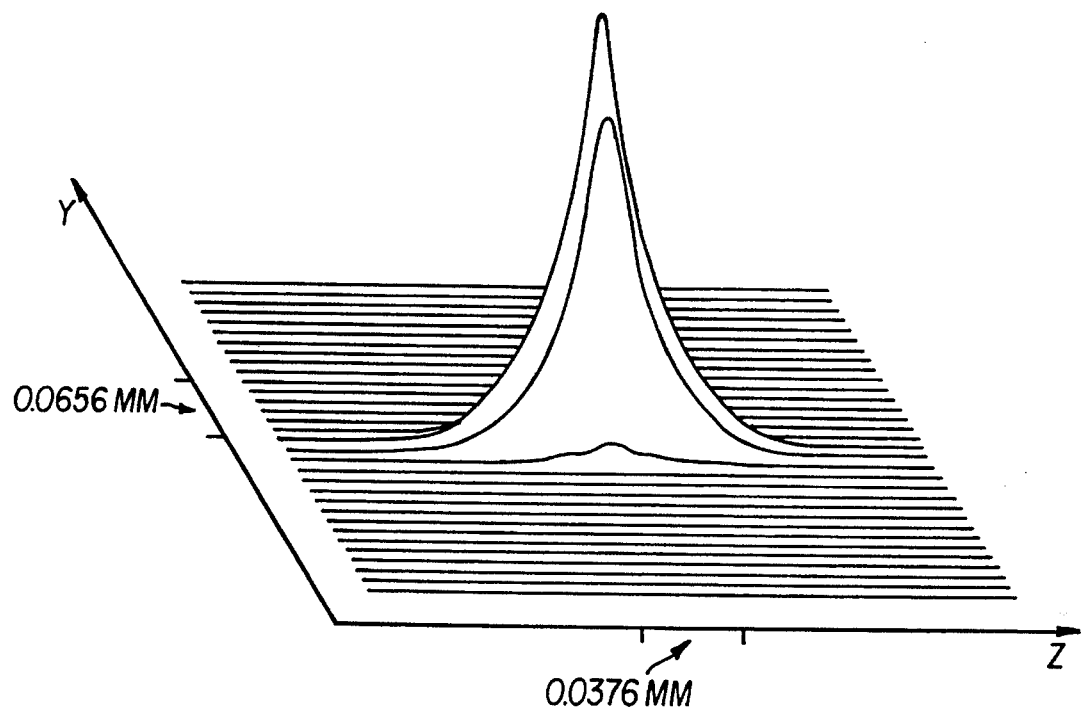
FIG. 13 is a plot of a polychromatic point spread function corresponding to the half field angle of 32° of the hybrid lens of FIG. 1.

The lens MTF plots are provided in FIG. 7, FIG. 10 and FIG. 12. These plots correspond to 0.0, 0.7 and 1.0 (full field) field of view and show high MTF values such as 0.4 or higher and more specifically of 0.5 or higher at a broad range of frequencies (5 to 30 cycles per mm) almost up to full field of view.

Other performance criteria data is shown on FIGS. 8, 10, 11, and 13. These figures also show that the lens has an unusually high quality performance for a single lens element.

Figure 8:
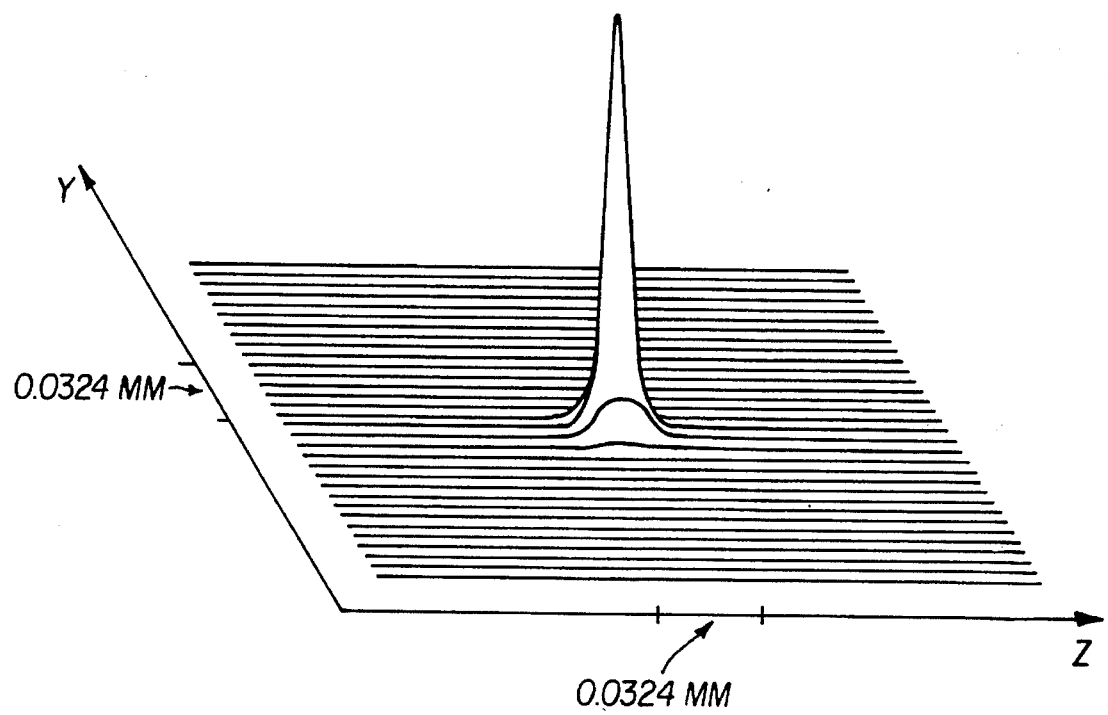
FIG. 8 is a plot of an on axis, polychromatic point spread function of the refractive/diffractive hybrid lens of FIG. 1.
Figure 9:
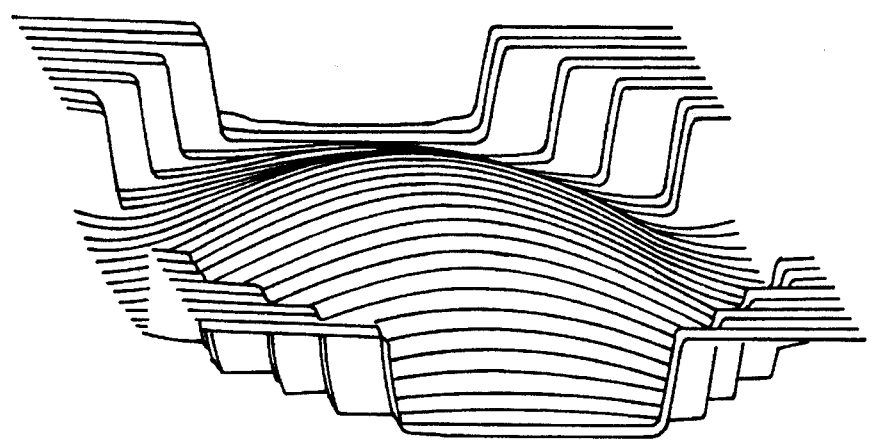
FIG. 9 is a plot of the optical path difference in the image plane generated by the refractive/diffractive lens of FIG. 1.

The lens shown in FIG. 1 focuses incoming on axial light rays down to a spot, therefore, the measure of quality for the lens will be polychromatic point spread function. This plot shows the amount of energy at the center of the spot of light produced by the lens, as well as the spread of this energy. The "spikier" this function, the smaller the spread of energy, the better is the lens. This plot is shown in FIG. 8. As we can see, this function is very "spikey" and thus the lens performance is indeed very good.

The hybrid lens of the first embodiment accommodates at least a ±32° field of view. The MTF value of the lens far exceeds the requirement for single-use camera lenses (which generally have an area weighted average MTF of about 0.3 in the range of 5 to 30 lines per mm) and provides a wide margin of error for manufacturing tolerances.

In addition to mounting alignment error, errors can also arise in lens manufacture. These errors will also effect adversely the performance of the lens element. However, because this lens has superior performance to begin with, a relatively large margin of manufacturing errors than what is typically allowed may be permissible. Thus, the price of the lens may be further reduced.

Since the lens of FIG. 1 has a diffractive surface with diffractive, i.e., a blazed surface relief element, also called a "Blazed Bleached Binary", or blazed surface relief element, the lens efficiency at a given λ is constant across the aperture. Therefore, this lens has high efficiency all the way from the center to the edge of the aperture.

Figure 14:
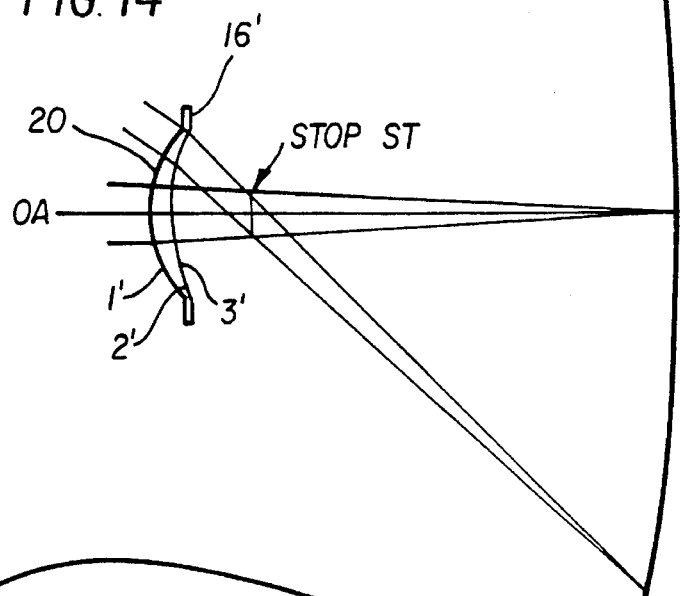
FIG. 14 is a schematic diagram of a second embodiment of a refractive/diffractive hybrid lens made in accordance with the invention and shown forming an image on a photographic film, the lens having a curved surface 1' and a diffractive grating surface 3' formed on curved substrate surface 2', the features on the diffractive surface being too small to be seen on the scale of the Figure.

With reference to FIG. 14, the diffractive/refractive hybrid lens 20 of the second embodiment is similar to the diffractive/refractive hybrid lens of the first embodiment. The lens 20 is a convex-concave singlet element having a curved surface 1' and a diffractive zone pattern 3' on the curved, underlying base surface 2' of the lens body which is the surface opposite to the first curved surface 1'. Both surfaces 1' and 2' are perpendicular to the optical axis of the lens. The refractive lens is made from optically transmissive material having an index of refraction of at least 1.45. FIG. 14 shows the lens 20 and emphasizes its curved (substrate) base surface 2' which defines the refractive portion of the element as well as the diffractive zone pattern 3' which defines the diffractive portion of the element. An annular ring 16' is part of the lens body and is merely for attachment and location in a camera barrel. The lens F-number is f/9 and it accommodates a field angle of ±35 degrees. The overall thickness of the lens is 1.6946 mm in this embodiment. The base radius of the curved surface 2' on which the diffractive grating of the lens 20 is formed, is located is 10.9339 mm to a point along the optical axis on the right of that surface. The diffractive profile 3' of the diffractive portion of the lens element 20 has a radius of curvature that corresponds to an effective focal length of 426.33 mm. Exemplary dimensions and spacings are set forth in Table 2. The refractive index $n_{\lambda n}$ is at the center of visible range corresponds to nominal wavelength $\lambda n \approx 587$ nm and $n_{\lambda n}$ is 1.4926. However, the unique feature of this design is that the lens, including the diffractive surface is not optimized for $\lambda_n \approx 587$ nm, but instead is optimized at the wavelength corresponding to the blaze wavelength $\lambda_b = 510$ nm (corresponding to $n_b = 1.496$) as described below in the specification. The resulting lens is achromatized for the range of 440 to 625 nm.

TABLE 2

| Surface | Radius | Thickness | Material | Index | V number |
|---------|--------|-----------|----------|-------|----------|
| 1 | 7.0321 | 1.6946 | Plexiglass | 1.492 | 57.3 |
| 2 | 10.9339[1] | 0 | Plexiglass | | |
| 3 | NA[2] | 0 | | 10,000 | -3.5 |
| Air | | 4.3444 | Air | 1. | 0.0 |
| Stop | | 25.6924 | | | |
| Image plane | -120.000[3] | | | | |

[1] Base radius is 10.9339. This surface profile is an asphere, where AD = -0.3862708E-3; AE = 0.4161633E-4; AF = -0.2147031E-5; and AG = 0.3952169E-7.
[2] This surface profile is an asphere. The aspheric profile of the surface as described by equation 12, and where AD = -0.1246612E-7; AE = 0.210645E-8; AF = -0.1467578E-9; and AG = 0.3613653E-11.
[3] Cylindrical shape.

The performance characteristics of this lens are provided in FIGS. 23A–D.

The condition for achromatism of a refractive/diffractive doublet with a positive focal length is satisfied with a positive refractive portion and a weak positive diffractive portion due to the negative dispersion of the diffractive portion of the lens. Normally, a refractive achromatic lens is composed of a negative and a positive focal length lens elements, since both element dispersions are positive. Consider design wavelengths $\lambda_f = 486$ nm, $\lambda_n = \lambda_d = 588$ nm, and $\lambda_c = 656$ nm.

The typical lens system is designed for a center wavelength $\lambda_n$ of 588 nm. However, taking an unusual approach, I optimized the lens system, including its diffraction profile for lens 20 for the central or blaze wavelength of $\lambda_b = 510$ nm, rather than at $\lambda = 587$ nm as is done for lens 10 of the first embodiment. I have discovered that by optimizing the diffraction surface 3' for $\lambda_b = 0.510$ µm, that the efficiency of the lens system is increased substantially.

An index of refraction of any refractive material varies with wavelength and can be calculated by use of the following formula:

$$n(\lambda) = \sqrt{A_0 + A_1\lambda^2 + \frac{A_2}{\lambda^2} + \frac{A_3}{\lambda^4} + \frac{A_4}{\lambda^6} + \frac{A_5}{\lambda^8}}, \quad (14)$$

where values of $A_o, A_1, \ldots, A_5$ are determined by method of least squares using measured values of n at six or more wavelengths. The Shot and Ohara optical glass catalogs provide these coefficients for every optical glass. For example, an index of refraction for acrylic at any wavelength may be calculated using the above formula and knowing that:

$A_0 = 2.1904237$ $A_1 = -0.2207493 \times 10^{-2}$ $A_2 = 0.1158779 \times 10^{-1}$ $A_3 = 0.2475242 - 10^{-3}$ $A_4 = -0.3382604 \times 10^{-6}$ $A_5 = 0.7357 \times 10^{-8} \quad (15)$ Thus, $n(\lambda = 0.5876 \, \mu m) = 1.491741$.

In order to get 100% efficiency at any given wavelength, one needs to achieve a constructive interference effect. As stated above, in order to do that the rings or zones have to be spaced exactly one wavelength away from the point F (FIG. 3). However, if one satisfies this condition of one wavelength difference at same wavelength $\lambda_b$, one will not be able to satisfy this condition for other wavelengths, i.e. $\lambda_r \neq \lambda_b$. Because the zones will not be spaced exactly one wavelength apart from the point F for wavelengths other than $\lambda_b$, the efficiency of the grating $\eta(\lambda)$ will be lower for these wavelengths. The drop in the diffraction efficiency $\eta$ depends on the detuning parameter $\alpha(\lambda)$ which in turn depends on the wavelength.

The detuning parameter $\alpha(\lambda)$ is characterized by $$a(\lambda) = \frac{\lambda_b}{\lambda} \cdot \frac{n(\lambda) - 1}{n_b - 1}, \quad (16)$$

where we chose $n_b = 1.491741$ and $\lambda_b = 0.5876$ µm.

The detuning parameter is related to $h_{max}$ where the $h_{max}$ is the maximum height of the grooves across the lens surface (FIG. 4)

$$h_{max} = \frac{\lambda_b}{n(\lambda_b) - 1}, \quad (17)$$

where $\lambda_b$ is the center or blaze wavelength of design and $\eta(\lambda_b)$ is the refractive index at this wavelength.

The detuning parameter $\alpha(\lambda)$ then can be characterized as $h_{max}$.

$$\alpha(\lambda) = h_{max}\left(\frac{n(\lambda)-1}{\lambda}\right) = \frac{h_{max}}{h(\lambda)}, \quad (18)$$

where $h_{max}$ is a height of grooves for maximum diffraction efficiency at $\lambda_b$ and $h(\lambda)$ is the height the grooves would need to be if the diffraction efficiency was to be 100% at that wavelength. Thus, since the grooves can have only one height, the grating is detuned at wavelengths other than $\lambda_b$.

As stated above, the diffraction efficiency $\eta(\lambda)$ of the lens is a function of wavelength and of the detuning parameter $\alpha(\lambda)$. The diffraction efficiency $\eta(\lambda)$ at any wavelength is calculated by:

$$\eta(\lambda) = \left[\frac{SIN[(\alpha(\lambda)-1)\pi]}{\pi(\alpha(\lambda)-1)}\right]^2. \quad (19)$$

The diffraction efficiency as a function of wavelength for the visible region, for the lens system optimized for $\lambda_b$=0.5876 µm is provided in FIG. 5. FIG. 5 shows that although the diffraction efficiency is highest at 0.5876 µm and although the diffraction efficiency stayed fairly high ($\eta>0.9$) for wavelengths higher than 0.5876, it drops off to 0.4 at 0.4 µm.

As a result, the total or overall efficiency $K_{\lambda blaze}$ of the lens throughout the wavelength region is about 0.86. This means that about 86% of light on the visible spectrum will be diffracted by the lens's diffractive surface towards the focal plane. Total or overall efficiency $K_{\lambda_b}$ is calculated as a normalized integral of the diffraction efficiency over the wavelength region—i.e.

$$K_{587} = \frac{\int_{.400}^{.670} \eta(\lambda)d\lambda}{\int_{.400}^{.670} 1 d\lambda} = 0.8609, \quad (20)$$

where $\lambda_b$=0.587 µm.

This is also the overall efficiency of the lens system 10 of the first embodiment.

Since the wavelength region in photographic systems is limited by the film spectral response at the red end and by the source spectral intensity at the blue end, I decided, for purposes of analysis and optimization that, 0.4 µm<$\lambda$<0.670 µm. However, a different spectral range may be used for the analysis and optimization (ex: 0.4 µm<$\lambda$<0.69 µm or 0.49 µm<$\lambda$<0.65 µm or 0.44 µm to 0.62 µm as was done in the design of the second embodiment).

A fraction of the light (in the visible spectrum) which is undiffracted is thus calculated to be 1.0–0.8609=0.1391 or about 14%. I discovered that shifting the central wavelength towards the blue end of the spectrum increases the overall spectrum efficiency K of the system.

For acrylic, $n(\lambda=0.540\mu m)=1.49413$. This value was calculated using equation 14.

Figure 15:
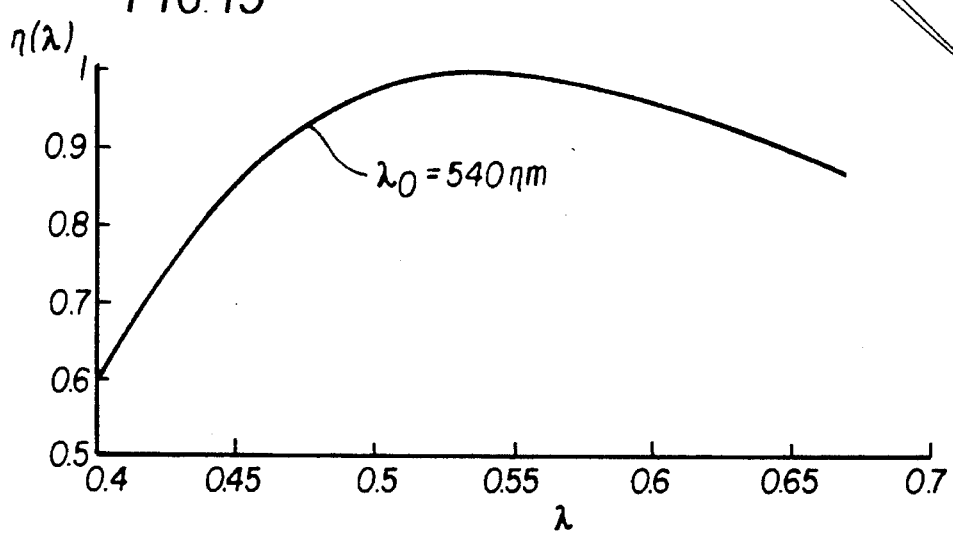
FIG. 15 is a graph of a diffraction efficiency profile of the lens system of FIG. 1 where the diffractive profile is optimized for λ=0.540 μm.

The diffraction efficiency $\eta(\lambda)$ of the lens system at any particular wavelength is calculated from the equation 19 and is plotted on FIG. 15. As expected, the diffraction efficiency $\eta$ is at its highest at the blaze wavelength $\lambda_b$=0.54 µm and drops down as the wavelength either increases towards 0.67 µm or decreases towards 0.41 µm. I then to discovered that while the diffraction efficiency for higher wavelength regions drop to compare to that of the system having efficiency shown in FIG. 16, the efficiency drop in higher wavelength is more than compensated by the efficiency boost in lower wavelengths. For example, while at the red end of the spectrum (i.e. at $\lambda$=0.61 µm), the efficiency is drop is from about 95% to about 87%, the efficiency at the blue end of the spectrum (i.e. at $\lambda$=0.4 µm) increases from about 36% to about 60%.

The total efficiency K when diffraction profile is designed for $\lambda_b$, i.e. $\lambda$ blaze of 0.540 µm is 0.912962 (i.e. $K_{0.540}$≈0.912). Thus, changing the central wavelength to $\lambda$=0.540 µm would result in 37.4% decrease in undiffracted or scattered light. This is calculated below:

$$\left(\frac{K_{.540} - K_{.587}}{1 - K_{.587}}\right) = 0.3742679. \quad (21)$$

Undiffracted or scattered light produces an undesirable fog-like appearance on the film. Since the optical film is more sensitive to blue light rather than the red light, decreasing the amount of undiffracted (scattered) blue light rather than the red will further improve the image quality.

Figure 16:
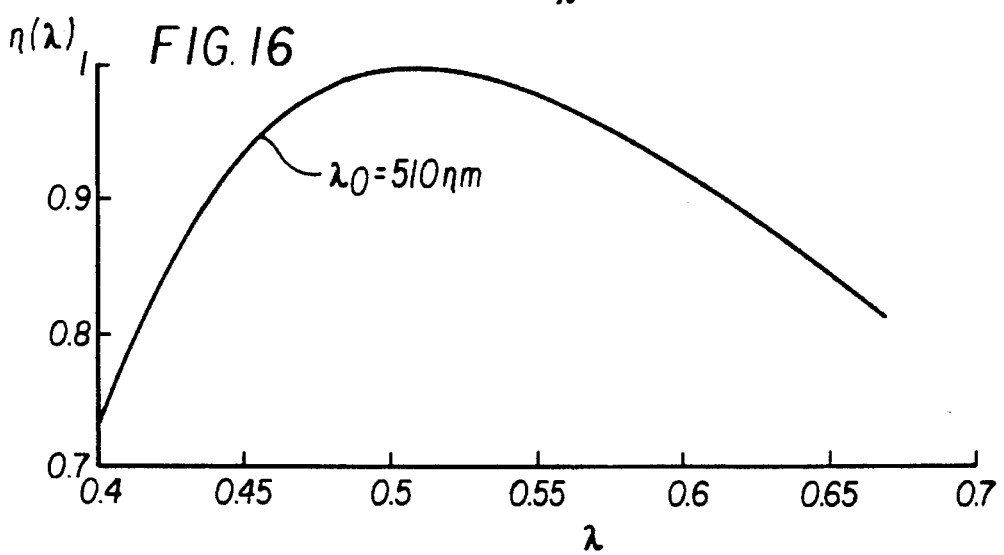
FIG. 16 is a graph of a diffraction efficiency profile of the lens 20 shown in FIG. 14 where the diffractive profile is optimized for λ=0.510 μm.

FIG. 16 is the graph of the diffraction efficiency $\eta$ of the optical system where the whole lens and thus the diffraction profile is optimized for $\lambda_{blaze}$=0.510 µm rather than the typical $\lambda$=0.588m. It can be seen from FIG. 16 that the diffraction efficiency in the red region has dropped further from that of FIG. 15. However, the efficiency curve is nicely balanced—there is a corresponding increase in the diffraction efficiency in the blue region. Calculating the total efficiency K throughout the spectral region at $\lambda_{blaze}$=0.510 we get $$K_{510} = \frac{\int_{.400}^{.670} \eta(\lambda)d\lambda}{\int_{.400}^{.670} 1 d\lambda} = 0.92224. \quad (22)$$

Thus, the overall efficiency throughout the spectrum is about 92.2%. The decrease in undiffracted light from that of the lens optimized at $\lambda_{blaze}$=0.587 µm is calculated to be:

$$\frac{K_{510} - K_{587}}{1 - K_{587}} = .4409581. \quad (23)$$

Changing the design wavelength $\lambda_b$ of the lens from 0.587 µm to 0.51 01 µm resulted in unexpected decrease of the magnitude of undiffracted light of 44%. That means, that there is a 44% reduction in undesired, scattered light. Thus, changing the central wavelength for the diffractive portion of the lens—rather than designing the diffractive surface at the central wavelengths used in a refractive portion of the lens—i.e. provided a substantial improvement to the overall quality of the lens using the central blaze wavelength of $\lambda_b$=0.510 µm for optimizing the lens design rather than $\lambda_b$=0.58 µm produces an optimum diffraction efficiency.

Alternatively, lenses can be designed with the traditional wavelengths ($\lambda_{central}$=0.587 µm, 486 µm<$\lambda$<656 µm) and then the diffractive features can be scaled to maximize the efficiency at 0.51 µm (or 0.530 µm, 0.540 µm etc.) by using the curvatures and the aspheric coefficients from the 587 nm design and scaling the curvatures and the aspherics by {n(510)/n(587)} which is approximately =0.510/0.587, i.e. the curvatures and aspheric coefficients get weaker by the ratio of the wavelengths.

Another advantage of the present invention is that lenses, such as the lenses of the first and the second embodiments (shown in FIGS. 1 and 14), are partially athermatized. This means, that such lens has a decreased sensitivity compared to the sensitivity of the single component achromat to changes in focal lengths which result from changes in temperature and humidity. Typical refractive elements have a decreased focal length with increasing temperature. The diffractive elements increase focal lengths with increased temperature. The thermally induced changes in the focal length of the diffractive element thus compensate for the thermally induced changes in the focal length of the refractive element. Therefore, the refractive/diffractive component shown in FIG. 1 has a decreased sensitivity to temperature changes.

Furthermore, among various advantages of a continuous blaze grating are:

1) higher diffraction efficiency;
2) elimination of alignment errors due to multiple step etching process;
3) elimination of wavefront errors due to etching process; and
4) the surface of the grating acts as an anti-reflection coating.

As previously described, a diffractive profile formed with "step function" method, typically results in 4–16 discrete steps comprising each zone (FIG. 5A). Such diffractive profiles result in a smaller efficiency (even at the central wavelength ). The efficiency of the diffractive profile formed by the "step function" method is described by the following equation:

$$\eta = \frac{SIN^2\left(\frac{\pi m}{p}\right) SIN^2[\pi(m+1)]}{(\pi m)^2 SIN^2\left[\frac{\pi}{p}(m+1)\right]};$$

where $p=2^N$, and where N is the number of masks, p is the number of steps and m is the diffraction order. (In this case, m=1 since the first order is used and m=0 represents undiffractive light).

A diffraction profile manufactured by a "step function" method (i.e. binary method) and which is made with four mask levels, i.e. a diffraction profile comprised of four masks or 16 steps, is 98.7% efficient at $\lambda_o$. A diffraction profile made of three masks and eight levels is 85% efficient. On the other hand, with a continuous blaze method, an efficiency is 100% at the central (i.e. blaze) wavelength.

A binary or a "step function" method also results in alignment errors which result in inaccurracies introduced in a diffractive surface profile. The errors are introduced because the manufacturing process requires that each mask level be aligned with respect to the other. For example, a single zone comprised of 16 steps is made with four masks. Each of the four masks has to be aligned with respect to the others. Although such masks are aligned to each other to within a fraction of micron, the alignment errors nevertheless cause decreased diffraction and introduce wavefront errors. At the present time, there is no known method resulting in a perfect alignment of the masks. By cutting the whole zone profile, one realizes an advantage of eliminating these alignment errors and increases the diffraction efficiency and eliminates the wavefront errors introduced by inaccurracies in alignment as well.

Yet another advantage of the present invention is that the diffractive surface of the lens also acts as an anti-reflection coating. I have discovered that if the diamond turning marks on the diffractive surface are spaced by less than the wavelength of light i.e. $d'<\lambda_n$ (see FIG. 4), light will not reflect or diffract from the pattern. This is a valuable property of the lens in that the amount of the unwanted or stray light is further reduced and thus the glare in the film may be reduced or elliminated. This kind of diffraction pattern can also be formed by other means, such as, lithography, but in the embodiments of FIGS. 1 and 14, it is preferably formed by a continuous or linear blaze method as described below.

In a preferred method of manufacturing these lenses, one calculates the exact phase for the diffractive wavefront and creates or specifies a surface profile to be cut with the diamond turning machine. The diamond turning machine may be used to cut the lens surface directly or, alternatively to cut a surface that will be used to manufacture a mold. The diamond turning machine is sampled at approximately 10 to 20 micron increments and at the maxima and minima of each diffractive fringe.

Figure 19:
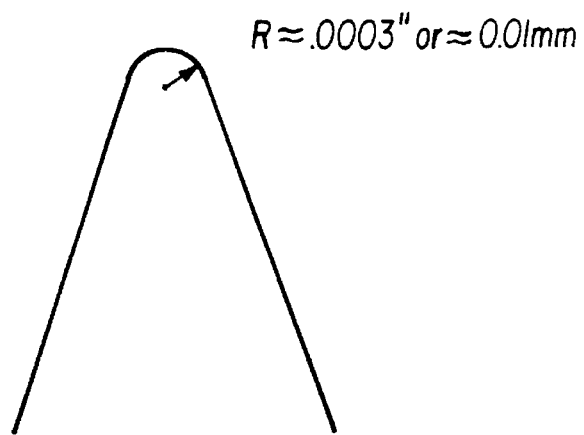
FIG. 19 shows a prior art rounded diamond tip.
Figure 20:
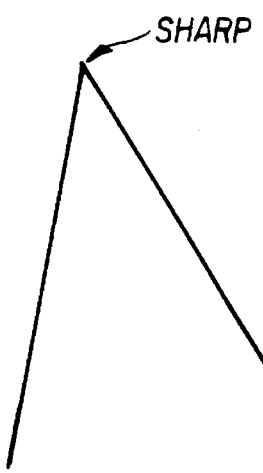
FIG. 20 shows a sharp diamond tip with no flat used in an apparatus of FIG. 17.

In order to fabricate sharp corners at the peaks and valleys of the diffractive surface, it is preferred to utilize a sharp diamond point tip (FIGS. 8, 20) as opposed to the traditional approach of using a radiused diamond tip (FIG. 19). Typically, diamonds used in diamond turning are fabricated with radii of 150 to 100 um. This radius helps to reduce surface roughness and increase lifetime, however, the radius on the tool limits the sharpness of the corners. The decreased sharpness in the corners leads to more scattering and more undiffracted light. Also, in many instances the zone spacings one is required to fabricate are smaller than the radius of the diamond tips. Therefore, it would be impossible to fabricate them with this type of a rounded diamond tip.

Figure 17:
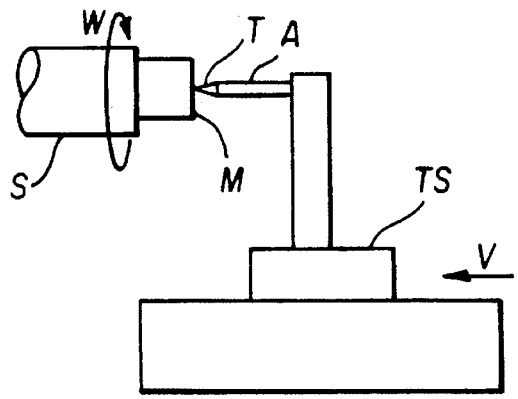
FIG. 17 is a schematic drawing of the manufacturing apparatus used to produce diffractive surfaces 3 and 3' of refractive/diffractive hybrid lenses shown in FIGS. 1 and 14.
Figure 18:
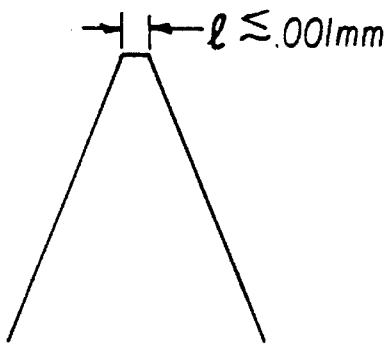
FIG. 18 shows a sharp diamond tip with a small flat used in an apparatus of FIG. 17.
Figure 21:
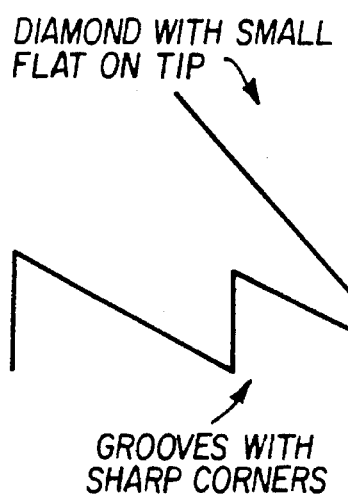
FIG. 21 shows that a diamond tip of FIG. 18 is canted at an angle relative to the work piece.

It is preferred to use a novel sharp diamond with a small flat (FIG. 18) (for example l≈1.0 to 0.5 um) on the end of the tip which is canted at an angle relative to the work piece to cut the diffractive surface (FIG. 21 ). The tip may be canted more or less depending on a diffractive surface profile at a particular location. It has been found that a sharp diamond tip (FIG. 20) with no flat may be used with success on plastic, but the tool wear or failure was much greater in this instance. The sharp diamond with the flat will cut plastic and metal (metal is cut in order to make a mold) to a high level precision with a relatively long tool life. A conventional diamond turning equipment (such as ASG-2500-T produced by Rank Pneumo [a division of Rank Taylor Hobson, Inc.]) was used. This equipment is shown schematically in FIG. 17 and comprises a translation stage TS which moves with the velocity V and a diamond tip T mounted on an arm A. The blank for the lens mold M to be used to manufacture the diffractive surface is mounted on a rotary spindle S which moves at rotary speed W. A cutting tool (ex. diamond) is moved radially along the surface in program amounts to create a profile for the surface. The surface is cut in a series of cuts in a radial (spiral) fashion. However, a conventional diamond tip is replaced with a special diamond tip T (shown in FIG. 18) as described above. In addition, the machine is generated at different cutting rates than conventional cutting rates. A typical conventional cutting speed for the rotary spindle is W=1000 RPM, where W is the rotational speed, the depth of the typically conventional cut is 0.002 mm and the translational rate V is at the order of 5 mm per minute. Initially, at first pass, a rotational speed W of 450 RPM and at the second pass a feed rate of 0.002 mm depth at the speed of 0.5 mm/minute and at the second pass a feed rate of 0.0005 mm at 0.5 mm/minute were used. However, it was found that cutting at a slow rotational speed W caused tool marks to appear at the surface. It was subsequently found that the best results are achieved when the rotational speed W is higher than the conventional rotational speed and where the transition stage velocity is lower and the cut shallower than the conventional transition stage velocity. More specifically, it is preferred to use the rotational speed W of 2000 RPM. At the first (rough) pass, a cut at a depth of about 0.001 mm depth is made, the feed rate of 1 mm/minute. At the second (rough) pass, a cut at 0.0005 mm depth at the speed of 0.5 mm/minute. One then progresses to a medium cut at the rates of 0.002 mm depths at the rate of 0.2 mm/minute feed rate. A finish step with a fine cut of 0.00002 mm depth at 0.05 mm/minute rate is then made. The initial blank to be cut is roughly of the desired (i.e. diameter) that is required of the final surface.

Figure 22:
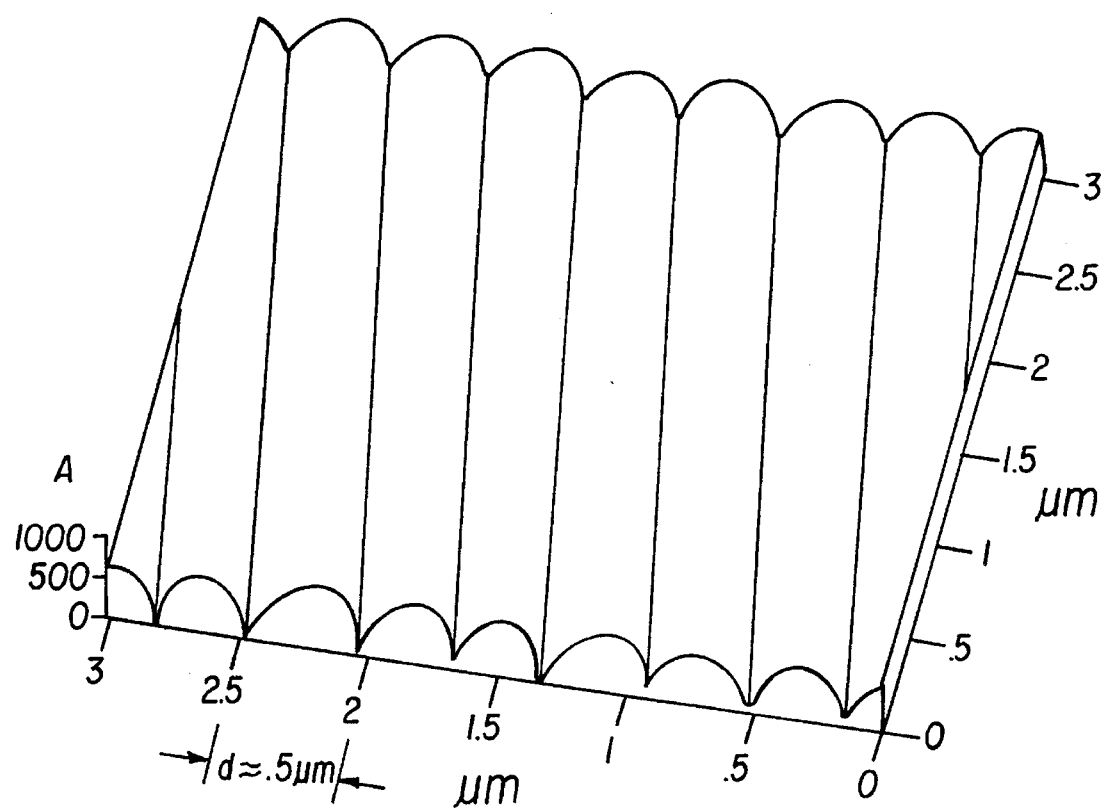
FIG. 22 shows final surface roughness characteristics of the preferred embodiment as seen through the atomic force microscope.
Figure 23A:
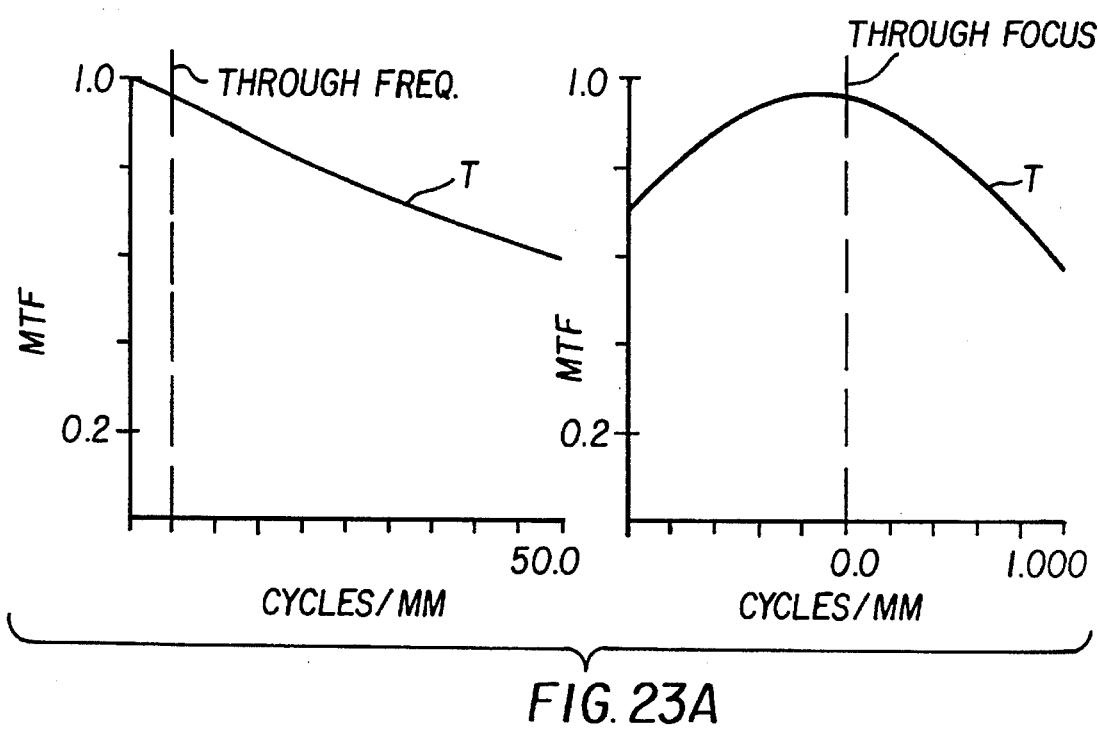
FIGS. 23A–D are plots of polychromatic MTF curves corresponding to 0, 0.5, 0.7 and full field of view of lens 20 of FIG. 14.
Figure 23B:
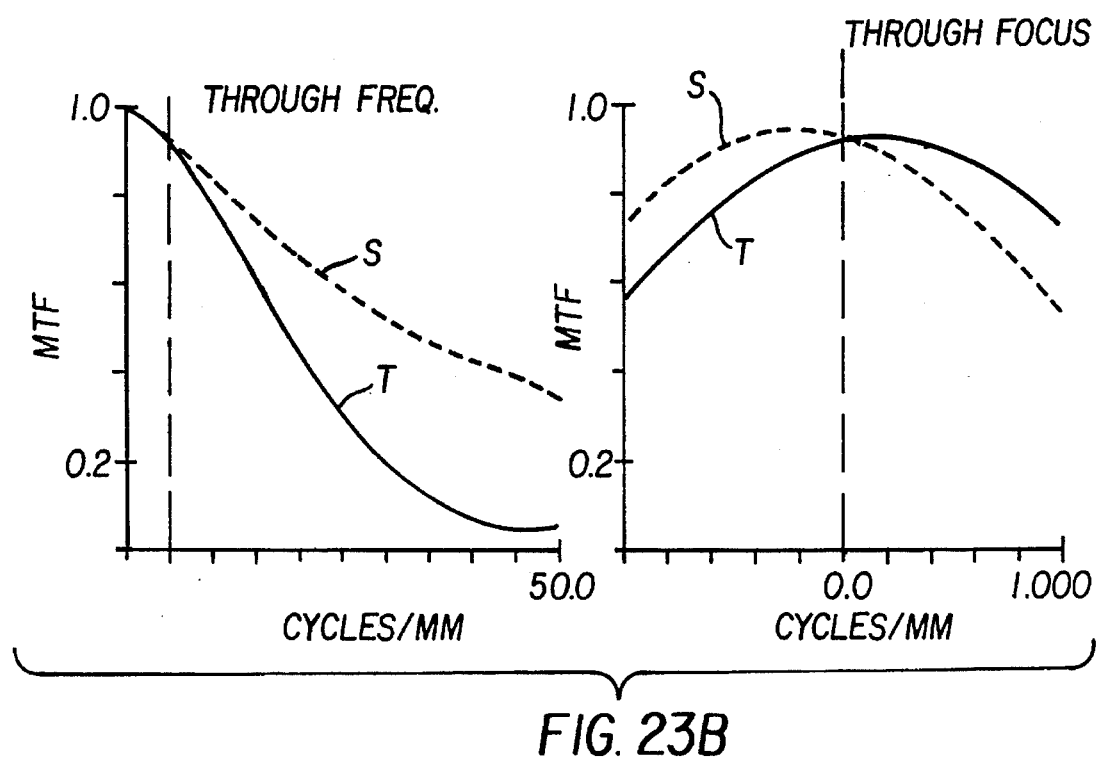
Figure 23C:
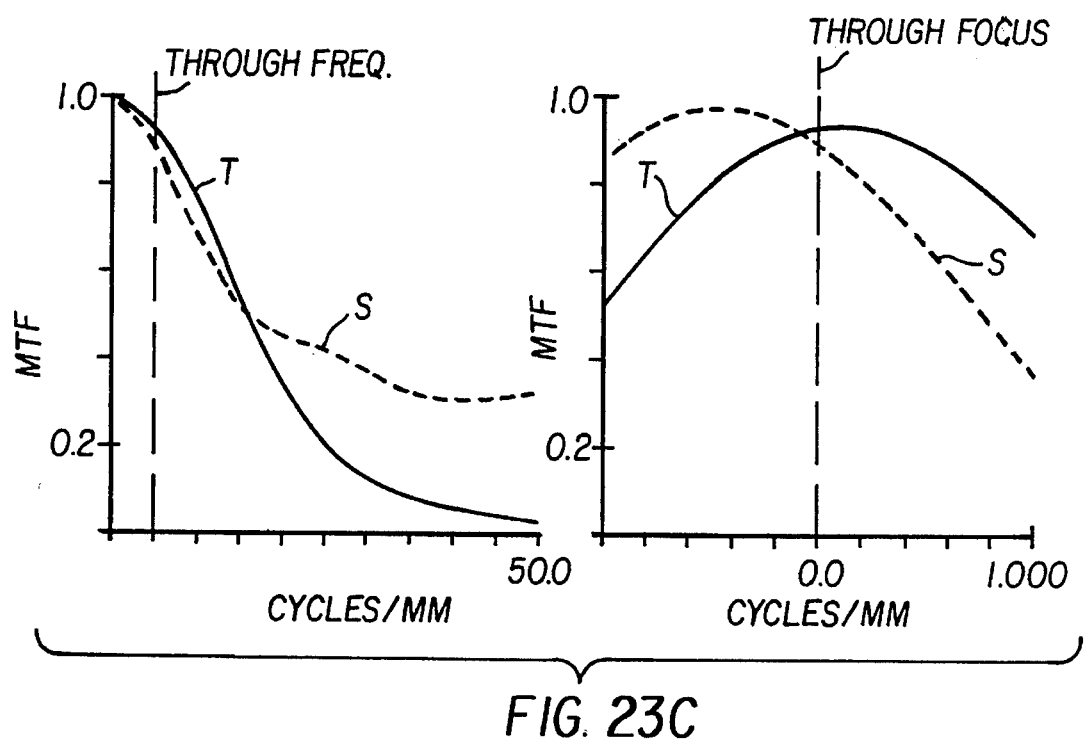
Figure 23D:
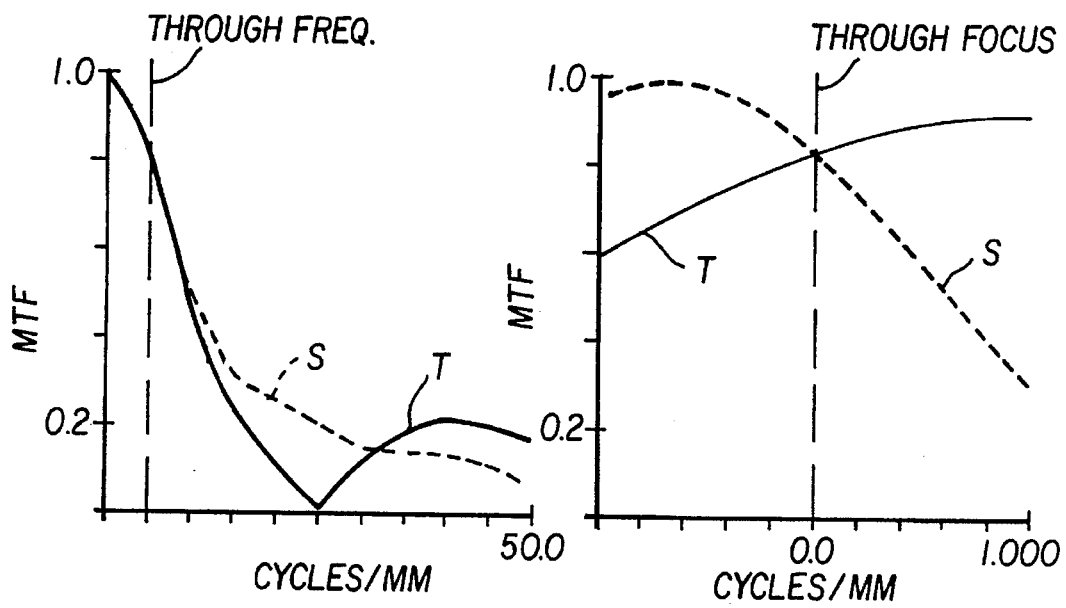

This process allows us to have about 50 to 250 very shallow tool marks per zone which is very different from the 4 to 16 steps in zones manufactured by the prior art methods. Because the tool marks are many and very shallow, due to the surface roughness characteristics, the diffractive surface acts as an anti-reflection coating and further improves the efficiency of the optical system. The resultant surface roughness is less than $\lambda/6$ peak-to-valley (P to V) and $\lambda/10$ RMS and may be as small as $<\lambda/50$ peak to valley or $\lambda/100$ RMS or even smaller. If the surface is too rough, there is lots of scattering. If the surface becomes too smooth, the anti-reflection properties tend to worsen. The surface roughness can be measured by conventional electron microscopes or with other conventional measurement equipment. FIG. 22 shows final surface roughness characteristics of one of the zones on a diffractive surface of the preferred embodiments as seen through the atomic force microscope.

As one can see, the distance d between the tool marks is less than 1 μm and more specifically is about 0.5 μm. It is preferred that this distance be 0.2 μm<d<6.0 μm.

Finally, the diffractive surface of the lens may be formed on a flat as well as a curved substrate. Forming the diffraction pattern on a curved substrate provides for an additional parameter (i.e., radius of curvature) to be used for aberration control.

Figure 24:
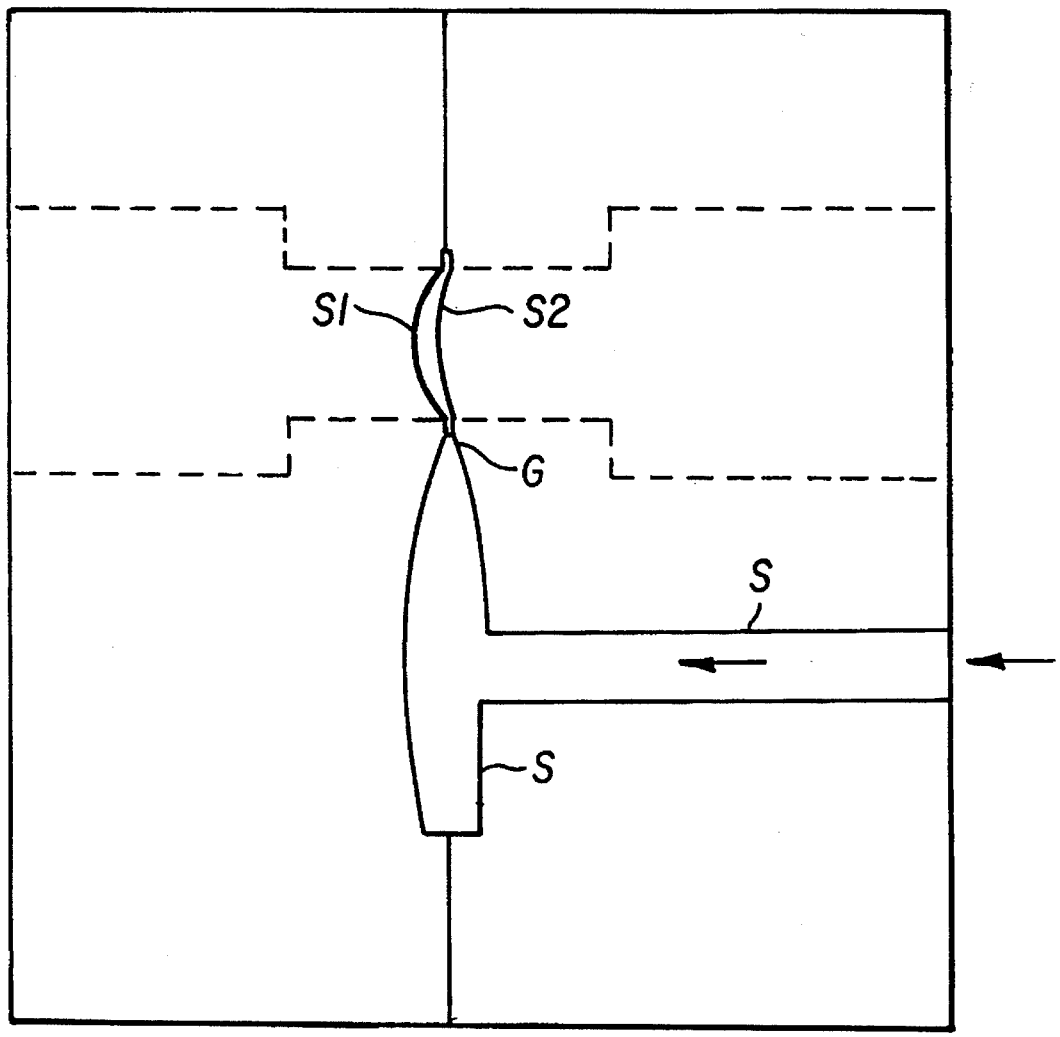
FIG. 24 is a schematic drawing showing how lens 10 or 20 may be molded.

The lens can be manufactured in a single step if the lens is molded. Single-step fabrication due to molding of a part is advantageous because it decreases cost, reduced number of fabrication steps and improves alignment of parts optical axis. If a molding method of manufacturing is used, a mold having an appropriate surface profile has to be manufactured first. A diffractive surface relief pattern is machined in metal and it becomes a mold for the diffractive portion or diffractive surface 3 of the lens. The mold for a refractive portion of the lens or surface 1 is made by conventional techniques. The optical material is then injected between the old surfaces S1 and S2 along the sprue S and into the gate G (FIG. 24). Once the optical material hardens, the mold (cavity block) is parted and the molded lens and the sprue is ejected. The final product (i.e. the lens 10, 20) is then broken off from the rest of the plastic and is ready for final assembly.

From the foregoing description, it will be apparent that the invention provides a diffractive/refractive hybrid achromat designed for use as a camera objective such as inexpensive or single-use cameras. Utilizing the characteristics of a diffractive lens, such as a dispersion of the opposite sign of ordinary glasses, a diffractive/refractive hybrid lens with an extremely good aberration control is obtained.

The use of a refractive/diffractive combination allows the use of smaller surface curvatures on each element which results in smaller aberrations, lower cost production and increased part tolerances. The use of a diffractive surface for the achromatizing element allows the fabrication of a single physical lens element which is achromatized and highly corrected for aberrations. The diffractive surface can be fabricated by etching or preferably machining the diffractive surface relief pattern onto one of the surfaces of a plastic injection mold. Alternately, the surface relief pattern can be formed via replication of a mold pattern in epoxy on the surface of a glass lens. It is also possible to form a holographic optical element on the back surface of the lens if an emulsion (such as dichromated gelatin) is coated on the lens element and exposed to the correct laser interference pattern.

Finally, the hybrid lens according to the present invention, is not limited to use in a single-use camera, but may be used in any simple objective lens camera or other image-capturing apparatus used to focus light in the visible spectrum and especially those made of a single-lens component or element. In addition, such a component or element may also be incorporated into a multiple-element objective system which requires achromatization in the visible region. Although in the above two embodiments the focal length is in 32 and 35 mm, the lens according to the present invention is particularly suitable for use in inexpensive cameras having 22 to 40 mm range and having an F-number f/5.6 or higher.

Variations and modifications within the scope of the invention will undoubtedly suggest themselves to those skilled in the art. Accordingly, the foregoing description should be taken as illustrative and not in a limiting sense.

We claim:

1. A method of manufacturing a diffractive surface profile comprising:

a) rotating a surface to be cut at a high speed W, where W>1,500 RPM;

b) translating a cutting tip at a low speed V, where V<1.2 mm/minute; and c) cutting said surface with said cutting tip.

2. The method of manufacturing according to claim 1, where cut W>2,000 RPM and V<0.5 mm/minute.

3. A method according to claim 2, wherein said cutting tip is a diamond tip.

4. A method according to claim 1, wherein said surface to be cut is a plastic surface of a lens component.

5. A method according to claim 1, wherein said surface to be cut is a mold part.

6. A method according to claim 1, wherein said cutting tip is a diamond tip.

7. A method according to claim 6, wherein said surface to be cut is a plastic surface of a lens component.

8. A method according to claim 6, wherein said surface to be cut is a mold part and including the steps of placing said mold part in a mold and molding a material in said mold against said mold part to form a lens with a diffractive surface profile.

9. A diffractive surface profile manufactured by method of claim 1.

10. A lens component comprising a diffractive surface profile, said diffractive surface profile being made by the method of claim 1.

11. An optical component comprising a diffractive surface profile, said diffractive surface profile produced by a mold having a complementary diffractive surface which is made by the method of claim 1.

12. A method according to claim 1, wherein said cutting tip has a small flat at its tip, said flat being equal to or less than 2 μm.

13. A method according to claim 12, wherein said flat tip is larger than 0.5 μm and smaller than 1 μm.

14. A method according to claim 13, wherein said surface to be cut is a plastic surface of a lens component.

15. A method according to claim 13, wherein said surface to be cut is a mold part.

16. A method according to claim 15, wherein said surface is a mold cut and including the steps of placing said mold part in a mold and molding a material in said mold against said mold part to form a lens with a diffractive surface profile.

17. A method according to claim 12, wherein said surface to be cut is a plastic surface of a lens component.

18. A method according to claim 12, wherein said surface to be cut is a mold part.

19. A method according to claim 18, wherein said surface is a mold cut and including the steps of placing said mold part in a mold and molding a material in said mold against said mold part to form a lens with a diffractive surface profile.

20. A method according to claim 12, wherein said surface is a mold cut and including the steps of placing said mold part in a mold and molding a material in said mold against said mold part to form a lens with a diffractive surface profile.

* * * * *